US012610153B2

(12) United States Patent
Nakai

(10) Patent No.: US 12,610,153 B2
(45) Date of Patent: Apr. 21, 2026

(54) INFORMATION PROCESSING APPARATUS, INFORMATION PROCESSING METHOD, AND PROGRAM

(71) Applicant: Sony Group Corporation, Tokyo (JP)

(72) Inventor: Yuki Nakai, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 183 days.

(21) Appl. No.: 18/576,221

(22) PCT Filed: Mar. 17, 2022

(86) PCT No.: PCT/JP2022/012408
§ 371 (c)(1),
(2) Date: Jan. 3, 2024

(87) PCT Pub. No.: WO2023/286367
PCT Pub. Date: Jan. 19, 2023

(65) Prior Publication Data
US 2024/0314454 A1 Sep. 19, 2024

(30) Foreign Application Priority Data
Jul. 15, 2021 (JP) ................................. 2021-117214

(51) Int. Cl.
| | |
|---|---|
| *H04N 23/90* | (2023.01) |
| *H04N 7/10* | (2006.01) |
| *H04N 23/61* | (2023.01) |
| *H04N 23/69* | (2023.01) |
| *H04N 23/951* | (2023.01) |

(52) U.S. Cl.
CPC ............. *H04N 23/90* (2023.01); *H04N 7/104* (2013.01); *H04N 23/61* (2023.01); *H04N 23/69* (2023.01); *H04N 23/951* (2023.01)

(58) Field of Classification Search
CPC ..... H04N 5/2228; H04N 5/2628; H04N 5/265
See application file for complete search history.

(56) References Cited

U.S. PATENT DOCUMENTS

| | | | | |
|---|---|---|---|---|
| 8,121,462 B2 * | 2/2012 | Nakai | ................ | H04N 21/8455 386/290 |
| 8,264,583 B2 * | 9/2012 | Yamaji | ................... | H04N 5/222 348/333.02 |
| 10,986,308 B2 * | 4/2021 | Huynh Thien | .............................. | H04N 21/234372 |

(Continued)

FOREIGN PATENT DOCUMENTS

| | | |
|---|---|---|
| CN | 112995509 A | 6/2021 |
| EP | 1480450 A2 | 11/2004 |

(Continued)

*Primary Examiner* — Boubacar Abdou Tchoussou
(74) *Attorney, Agent, or Firm* — Paratus Law Group, PLLC

(57) ABSTRACT

An information processing apparatus according to the present technology includes: a composition selection unit that selects a composition of a camera on the basis of a composition selection table in which weight information is associated with each combination of an imaging target by the camera and a composition type of the camera; and a composition switching control unit that performs control for switching the composition of the camera to the composition selected by the composition selection unit.

16 Claims, 14 Drawing Sheets

(56)     References Cited

U.S. PATENT DOCUMENTS

| | | | | |
|---|---|---|---|---|
| 11,783,861 B2 * | 10/2023 | Jin | .......................... | G06V 20/48 |
| | | | | 386/280 |
| 2021/0204003 A1 | 7/2021 | Nicol | | |
| 2022/0191406 A1 | 6/2022 | Ikeda | | |

FOREIGN PATENT DOCUMENTS

| | | | |
|---|---|---|---|
| EP | 3285477 | A1 | 2/2018 |
| JP | 2005-277845 | A | 10/2005 |
| JP | 2008-288745 | A | 11/2008 |
| JP | 2014-192743 | A | 10/2014 |
| WO | WO 2010/027080 | A1 | 3/2010 |
| WO | WO-2020189057 | A1 | 9/2020 |

* cited by examiner

*FIG. 3*

CAM1 (PRIMARY CAMERA)

CAM2 (VIRTUAL CAMERA)

CAM3 (VIRTUAL CAMERA)

FIG. 4
A
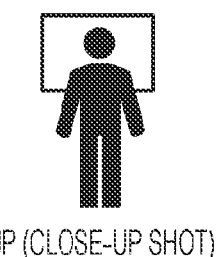
UP (CLOSE-UP SHOT)
B
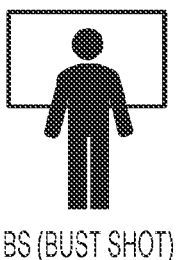
BS (BUST SHOT)
C
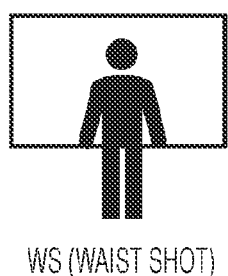
WS (WAIST SHOT)
D
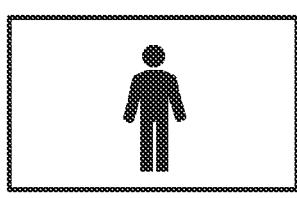
FF (FULL FIGURE)

| IMAGING TARGET | COMPOSITION TYPE | WEIGHT |
|---|---|---|
| VOCAL | UP | 30% |
|  | BS | 10% |
|  | WS | 5% |
| GUITAR | UP | 15% |
|  | WS | 15% |
|  | FF | 5% |
| BASS | WS | 10% |
|  | FF | 5% |
|  | UP | 5% |

FIG. 8

| IMAGING TARGET | COMPOSITION TYPE | WEIGHT |
|---|---|---|
| VOCAL | UP | 30% |
|  | BS | 10% |
|  | WS | 5% |
| GUITAR | UP | 15% |
|  | WS | 15% |
|  | FF | 5% |
| BASS | WS | 10% |
|  | FF | 5% |
|  | UP | 5% |

| IMAGING TARGET | COMPOSITION TYPE | WEIGHT |
|---|---|---|
| MEMBER A | UP | 15% |
| | BS | 10% |
| | WS | 10% |
| MEMBER B | UP | 15% |
| | BS | 10% |
| | WS | 10% |
| MEMBER C | UP | 15% |
| | BS | 10% |
| | WS | 5% |

FIG. 14

| IMAGING TARGET | COMPOSITION TYPE | WEIGHT |
|---|---|---|
| MEMBER A | UP | 50% |
| | BS | 30% |
| | WS | 20% |
| MEMBER B | UP | 0% |
| | BS | 0% |
| | WS | 0% |
| MEMBER C | UP | 0% |
| | BS | 0% |
| | WS | 0% |

FIG. 15

| IMAGING TARGET | COMPOSITION TYPE | WEIGHT |
|---|---|---|
| MEMBER A | TRAVELING LINE A UP | 30% |
| | TRAVELING LINE A BS | 20% |
| | TRAVELING LINE A LOW ANGLE | 0% |
| MEMBER B | TRAVELING LINE B UP | 30% |
| | TRAVELING LINE B BS | 20% |
| | TRAVELING LINE B LOW ANGLE | 0% |

FIG. 16

| IMAGING TARGET | COMPOSITION TYPE | WEIGHT |
|---|---|---|
| MEMBER A | TRAVELING LINE A UP | 20% |
| | TRAVELING LINE A BS | 0% |
| | TRAVELING LINE A LOW ANGLE | 80% |
| MEMBER B | TRAVELING LINE B UP | 0% |
| | TRAVELING LINE B BS | 0% |
| | TRAVELING LINE B LOW ANGLE | 0% |

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2022/012408 (filed on Mar. 17, 2022) under 35 U.S.C. § 371, which claims priority to Japanese Patent Application No. 2021-117214 (filed on Jul. 15, 2021), which are all hereby incorporated by reference in their entirety.

TECHNICAL FIELD

The present technology relates to an information processing apparatus, a method thereof, and a program, and more particularly to an imaging control technology.

BACKGROUND ART

As the control related to imaging, for example, it is conceivable to control the direction of a camera so as to track a detected subject (that is, subject tracking control) or perform zoom control of the camera so as to match the preset angle of view.

Patent Literature 1 below discloses a technique for controlling the direction of a camera so that an object is imaged. Specifically, Patent Document 1 discloses a technique of detecting a subject position based on a captured image, detecting a subject position using a radio tag held by a subject, and controlling the direction of a camera on the basis of these two detection results.

Furthermore, Patent Literature 2 below discloses a technique for controlling an imaging direction and an imaging operation of a camera on the basis of position information and sound information transmitted from an individual information transmitter attached to a subject.

CITATION LIST

Patent Document

Patent Document 1: Japanese Patent Application Laid-Open No. 2008-288745
Patent Document 2: Japanese Patent Application Laid-Open No. 2005-277845

SUMMARY OF THE INVENTION

Problems to be Solved by the Invention

Here, for example, as captured image content targeted for an event such as a music live show, it is desirable to create high-quality content that is not boring by appropriately switching the composition of the camera or the like.

However, it is difficult for an unfamiliar user to select an appropriate composition, and there is a possibility that work by a skilled person is required. Furthermore, in the first place, manually selecting the composition promotes an increase in cost in creating the captured image content.

The present technology has been made in view of the above circumstances, and an object of the present technology is to achieve both improvement in the quality of content and a reduction in work cost related to content creation for captured image content accompanied by composition switching.

Solutions to Problems

An information processing apparatus according to the present technology includes: a composition selection unit that selects a composition of a camera on the basis of a composition selection table in which weight information is associated with each combination of an imaging target by the camera and a composition type of the camera; and a composition switching control unit that performs control for switching the composition of the camera to the composition selected by the composition selection unit.

The camera in the present specification is a concept including both a real camera and a virtual camera in which a composition is virtually changed by cutting out a part of an image obtained by a light receiving operation of the real camera. Furthermore, when both a real camera and a virtual camera are defined as "cameras" as described above, "imaging" means an operation of obtaining an image by the real camera and the virtual camera.

According to the configuration described above, the composition switching of the camera is automatically performed on the basis of the composition selection table, and the composition switching mode of the camera can be appropriately set by setting the weight information in the composition selection table.

Furthermore, an information processing method according to the present technology is an information processing method in which an information processing apparatus selects a composition of a camera on the basis of a composition selection table in which weight information is associated with each combination of an imaging target by the camera and a composition type of the camera, and performs control for switching the composition of the camera to the selected composition.

Furthermore, a program according to the present technology is a program readable by a computer device, the program causing the computer device to implement a function of selecting a composition of a camera on the basis of a composition selection table in which weight information is associated with each combination of an imaging target by the camera and a composition type of the camera, and performing control for switching the composition of the camera to the selected composition.

With these information processing method and program, the information processing apparatus according to the present technology described above is implemented.

BRIEF DESCRIPTION OF DRAWINGS

FIG. 3 is a diagram illustrating an image diagram of a captured image by a virtual camera.

FIG. 4 is an explanatory diagram of an example of a composition type in the first embodiment.

FIG. 6 is an explanatory diagram of functions of the information processing apparatus as the embodiment.

FIG. 7 is an explanatory diagram of a composition selection table according to the first embodiment.

FIG. 8 is a diagram for explaining an example of composition selection based on prohibited transition composition information.

FIG. 11 is a diagram illustrating a configuration example of an image processing system as a second embodiment.

FIG. 13 is a diagram illustrating an example of the composition selection table before weight information is updated.

FIG. 14 is a diagram illustrating an example of the composition selection table after weight information is updated.

FIG. 15 is a diagram illustrating an example of a composition selection table for a robot camera.

FIG. 16 is an explanatory diagram of an update example of weight information in the composition selection table of a robot camera.

MODE FOR CARRYING OUT THE INVENTION

Hereinafter, embodiments according to the present technology will be described in the following order with reference to the accompanying drawings.

<1. First Embodiment>
(1-1. Image processing system as first embodiment)
(1-2. Hardware configuration of information processing apparatus)
(1-3. Composition control as embodiment)
(1-4. Processing procedure)
<2. Second Embodiment>
<3. Modifications>
<4. Program>
<5. Summary of embodiment>
<6. Present technology>

1. First Embodiment (1-1. Image Processing System as First Embodiment)

Figure 1:
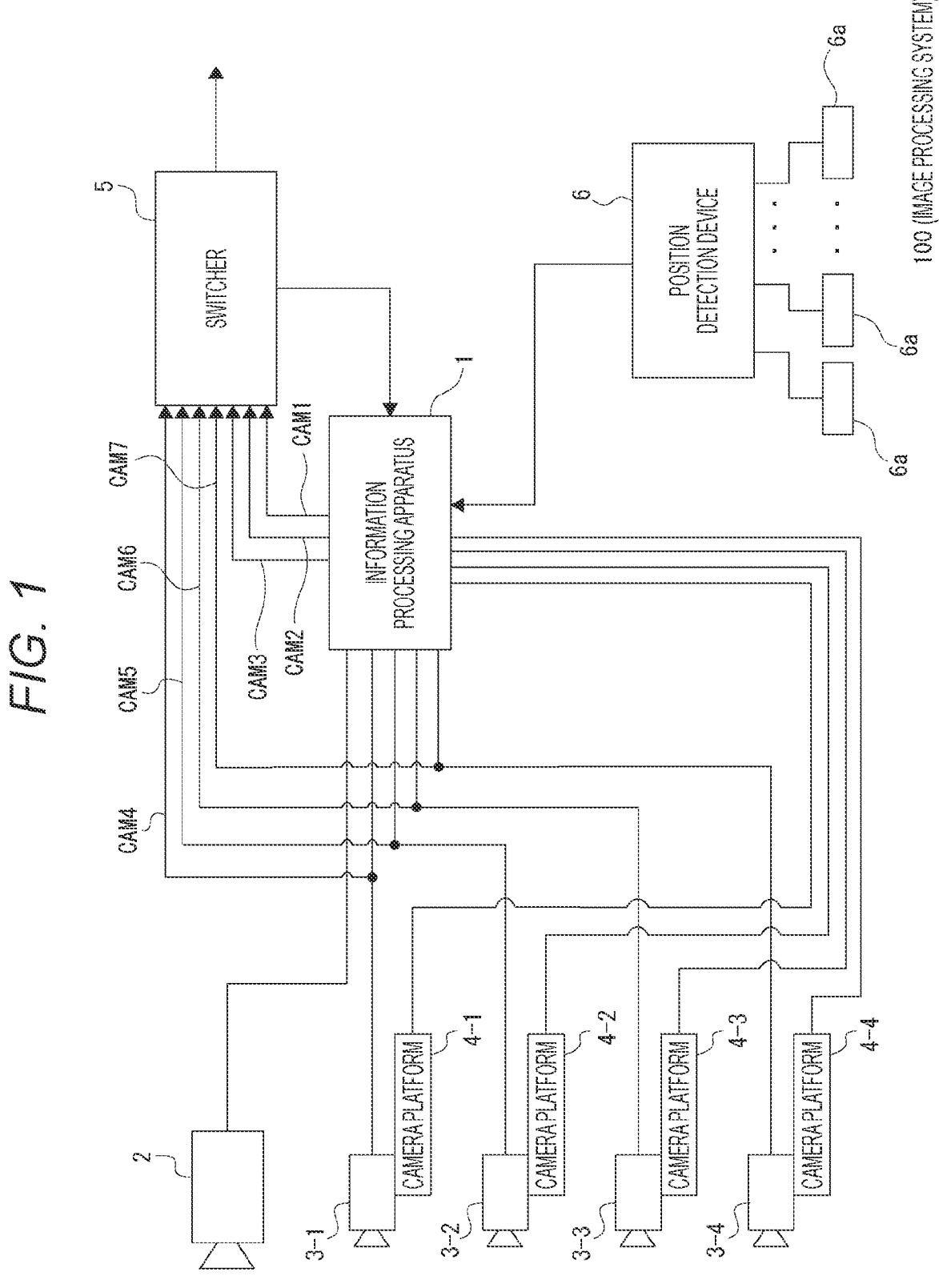
FIG. 1 is a diagram illustrating a configuration example of an image processing system including an information processing apparatus as a first embodiment according to the present technology.

FIG. 1 illustrates a configuration example of an image processing system 100 including an information processing apparatus 1 as a first embodiment according to the present technology.

As illustrated, the image processing system 100 includes an information processing apparatus 1, a primary camera 2, a secondary camera 3, a camera platform 4, a switcher 5, and a position detection device 6.

In the present example, there are a single primary camera 2 and a plurality of secondary cameras 3, and specifically, four secondary cameras 3 are used. In the case of individually distinguishing the four secondary cameras 3, numerical values of "- (hyphen)" are added to the end of the reference numerals as illustrated in the drawing, and the reference numerals are each denoted as "3-1", "3-2", "3-3", and "3-4".

Each of the primary camera 2 and the secondary camera 3 is configured as an imaging device that includes an imaging element such as a charge coupled device (CCD)

image sensor or a complementary metal oxide semiconductor (CMOS) image sensor and performs imaging.

The camera platform 4 is configured as an electronic camera platform, and is configured to support the secondary camera 3 and to be capable of changing the orientation of the secondary camera 3 in each of the pan direction and the tilt direction on the basis of a control signal from the outside.

In the present example, the camera platform 4 is provided for each secondary camera 3. Hereinafter, in the case of individually distinguishing the four camera platforms 4, numerical values of "- (hyphen)" are added to the end of the reference numerals as illustrated in the drawing, and the reference numerals are each denoted as "4-1", "4-2", "4-3", and "4-4".

In the image processing system 100, an object is imaged from a plurality of viewpoints by a plurality of cameras as the primary camera 2 and the secondary camera 3, and images of a plurality of systems obtained on the basis of the imaging are input to the switcher 5.

The switcher 5 selects and outputs one system of images from the input plurality of systems of images on the basis of an operation. In the present example, captured image content for a target event is generated by the image selected and output by the switcher 5.

The captured image content generated on the basis of the output image of the switcher 5 can be distributed via a network such as the Internet or can be transmitted by a broadcast wave, for example. Alternatively, the captured image content can be recorded (recorded) in a predetermined recording medium.

In the present example, the imaging target event by the camera is a music live event, and the primary camera 2 and the secondary camera 3 are installed in a live venue.

Figure 2:
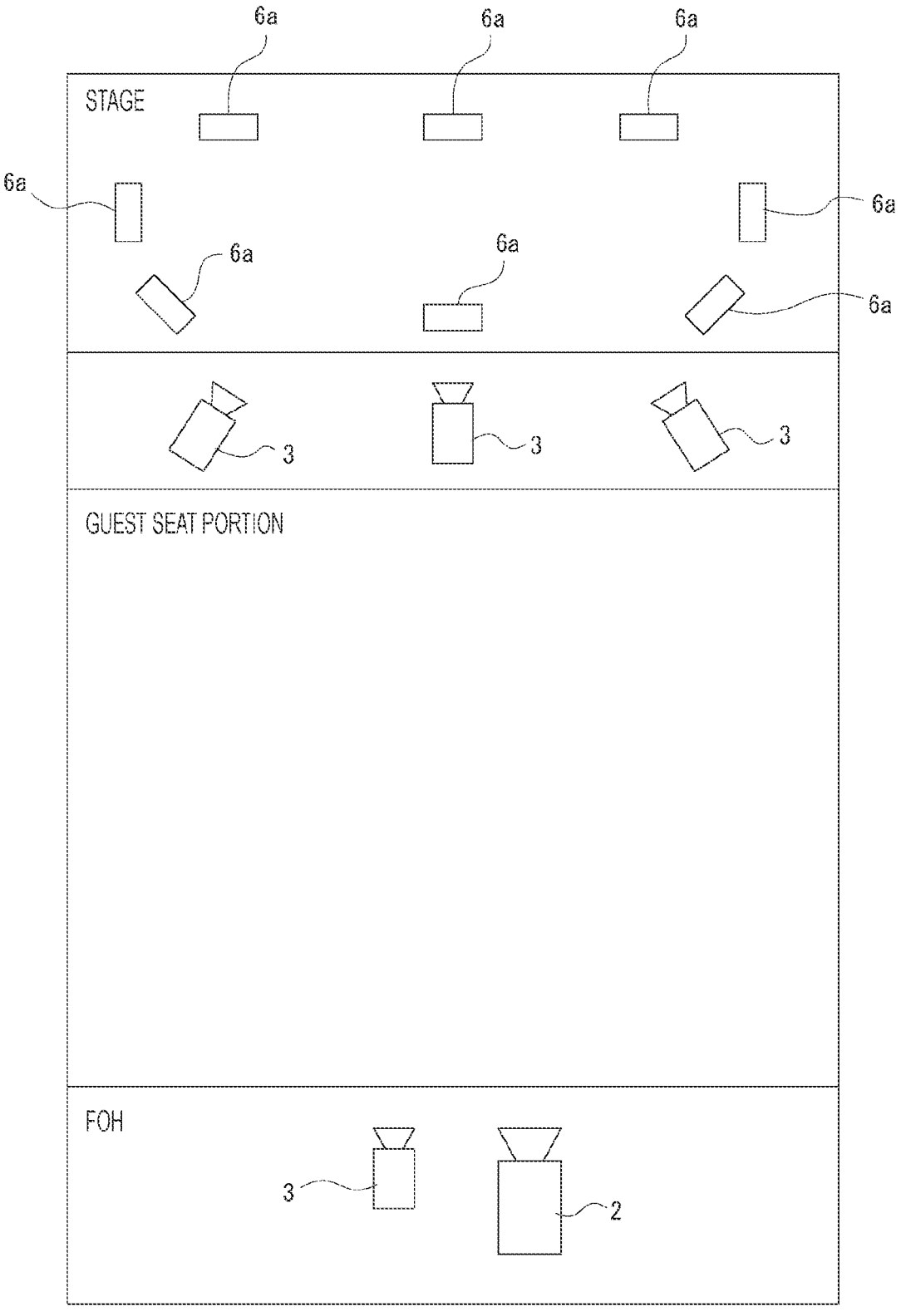
FIG. 2 is an image diagram of a live venue assumed in the first embodiment.

FIG. 2 is an image diagram of a live venue assumed in the embodiment.

As illustrated, the live venue is provided with a stage, a guest seat portion, and a front of house (FOH). On the stage, performers such as players and singers perform.

The guest seat portion is located behind the stage and is a space capable of accommodating spectators.

The FOH is located behind the guest seat portion and is a space in which elements related to live performance such as lighting and various devices for controlling the sound of the venue are arranged. A person on the live organizer side such as a director or a staff member can enter the FOH.

In the present example, the primary camera 2 is a camera for capturing the entire stage within the angle of view, and is arranged in the FOH. In the present example, the resolution of the image captured by the primary camera 2 is 4K (3840×2160) while the resolution of the image output by the switcher 5 is FHD (Full High Definition: 1920×1080). Furthermore, in the present example, a camera without an optical zoom is used as the primary camera 2.

Furthermore, three out of the secondary cameras 3 are arranged in a space (what is called a space in front of a front fence) between the stage and the guest seat portion, and a performer on the stage can be captured within the angle of view at a position closer than the FOH. As illustrated in the drawing, the three secondary cameras 3 are each arranged at the central portion and the left and right end portions in the left-right direction (direction orthogonal to the front-rear direction).

The remaining one of the secondary cameras 3 is arranged in the FOH. This secondary camera 3 is used as a camera for capturing a performer on the stage in telephoto.

In the present example, a camera including an optical zoom is used as each secondary camera 3. Furthermore, in the present example, each secondary camera 3 is configured to be able to change the output resolution of the captured image. Specifically, switching between at least 4K and FHD is possible as the output resolution.

As described later, in the image processing system 100 of the present example, the orientation of the secondary camera 3 is controlled so as to track a subject such as a performer on the stage. For this purpose, the image processing system 100 is provided with the position detection device 6 illustrated in FIG. 1.

The position detection device 6 is configured as a device for detecting the position of the radio tag, and includes a plurality of receivers 6a that receives radio waves transmitted from the radio tag. In the present example, the position detection device 6 performs position detection by an ultra wide band (UWB) method. By attaching a radio tag to a subject that can be a tracking target, the position of the subject can be detected.

In the present example, a subject to be tracked is a performer on the stage, and in this case, the plurality of receivers 6a are arranged so as to surround an activity area of the performer (an area including the central portion of the stage) on the outer peripheral portion of the stage as illustrated in FIG. 2.

Note that the method of detecting the position of the subject is not limited to the ultra wide band (UWB) method, and various methods can be considered. For example, a method using a wireless local area network (LAN), specifically, a method in which a plurality of wireless LAN access points is provided and a position is detected on the basis of an arrival time difference of radio waves with each access point, a method in which a position is detected using a three-dimensional measurement result by a time of flight (ToF) sensor, and the like can be exemplified.

Here, as illustrated in FIG. 1, in the image processing system 100 of the present example, images of a total of seven systems of a CAM1 to a CAM7 are input to the switcher 5.

For the images of the CAM4 to the CAM7, images captured by the four secondary cameras 3 are input to the switcher 5. The images of the CAM1 to the CAM3 are images generated by the information processing apparatus 1 as a computer device on the basis of images captured by the primary camera 2.

Figure 3:
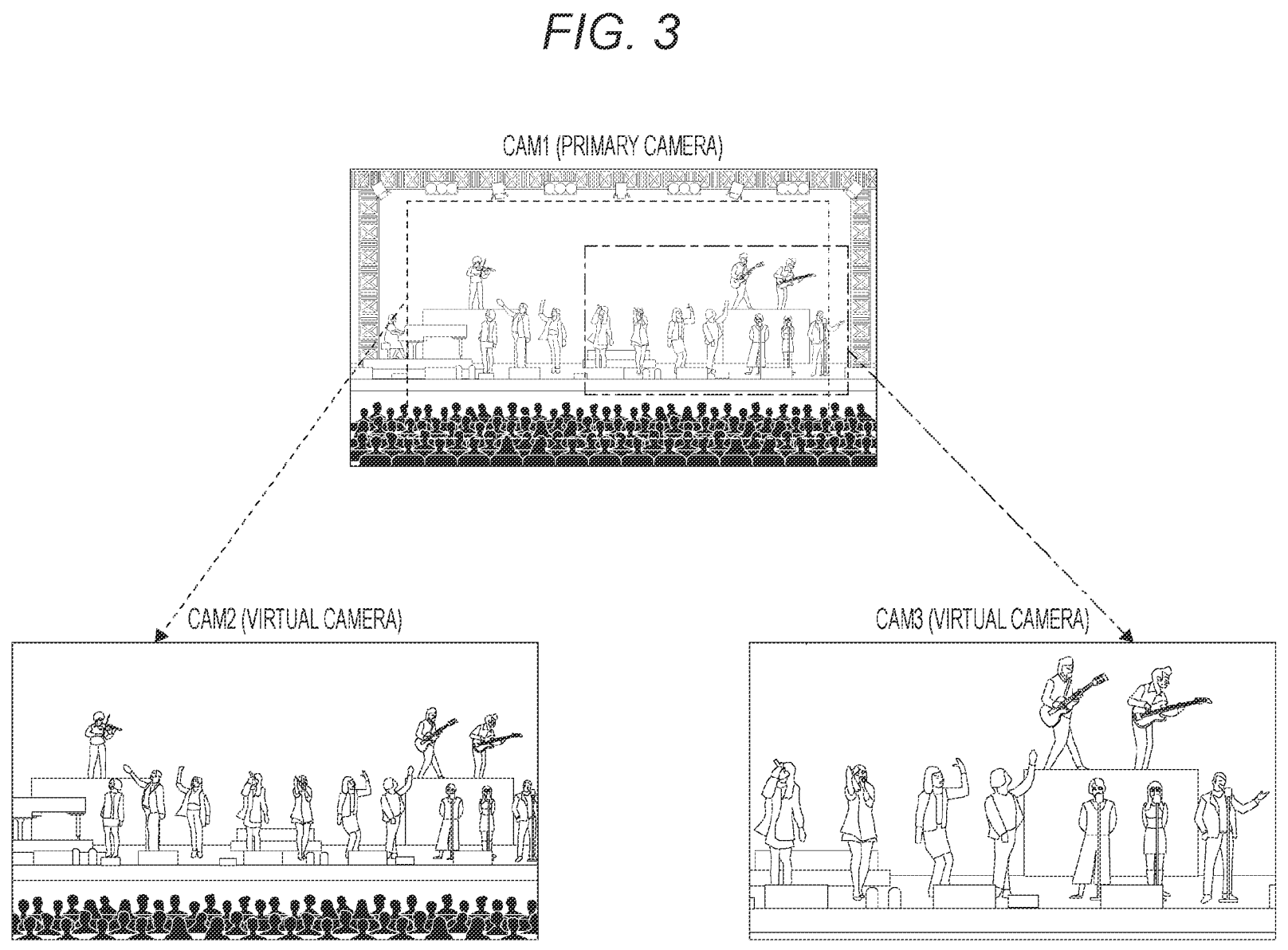

FIG. 3 illustrates image diagrams of images of the CAM1 to the CAM3.

Basically, the image captured by the primary camera 2 is output as it is as the image of the CAM1. That is, an image having a basic angle of view that is the angle of view of the image captured by the primary camera 2 is output. For the image of the CAM1, electronic zoom processing (that is, image cutout processing) may be performed on the image captured by the primary camera 2, and an image with an angle of view narrower than the angle of view of the image captured by the primary camera 2 may be output.

Each image of the CAM2 and the CAM3 is an image cut out from the image captured by the primary camera 2. For the images of the CAM2 and the CAM3, not only the cutout size of the image but also the cutout position can be adjusted. Here, changing the cutout position with respect to the captured image corresponds to virtually changing the positional relationship between the camera and the subject, and changing the cutout size with respect to the captured image corresponds to virtually changing the magnification of the optical zoom. That is, obtaining an image by changing the cutout position and the cutout size with respect to the captured image can be said to correspond to changing the composition by virtually moving or operating a camera (virtual camera).

In the present specification, the term "camera" is used as a concept including both such a virtual camera and a real camera such as the primary camera 2 and the secondary camera 3. In other words, in the present specification, the term "camera" refers to a concept including both a real camera and a virtual camera that virtually changes a composition by cutting out a part of an image obtained by a light receiving operation of the real camera.

Furthermore, in the present specification, the term "imaging" is used, and when both the real camera and the virtual camera are defined as "camera" as described above, the "imaging" means an operation of obtaining an image by the camera.

Note that, in the following description, image cutout may be referred to as "cutout".

In the present example, as the image of the CAM2, for example, an image including all subjects as the performers detected in the image captured by the primary camera 2 is generated. In the present example, the composition containing all the subjects is adaptively changed according to the number and positions of the subjects detected in the captured image (an image with 4K resolution in the present example) of the primary camera 2. That is, when a new subject is detected in the image captured by the primary camera 2, composition determination is performed including the subject, and in a case where the number of the detected subjects decreases, composition determination is performed on the basis of the positions of the remaining subjects. Note that, for the image of the CAM2, when no subject is detected on the stage, an image region of the FHD size having the same center as the image captured by the primary camera 2 is cut out.

Furthermore, in the present example, as the image of the CAM3, for example, an image having a basic angle of view narrower than the angle of view of the image captured by the primary camera 2 is generated by cutout and output. For example, the image of the CAM3 is cut out as an image with a center that coincides with the center of the image captured by the primary camera 2.

Here, the information processing apparatus 1 illustrated in FIG. 1 includes, for example, a computer device having a central processing unit (CPU), and generates images of the CAM1 to the CAM3 as described above on the basis of an image captured by the primary camera 2, and also performs composition control on an image captured by the secondary camera 3 as a real camera.

The composition type adopted in the present embodiment will be described with reference to FIG. 4.

Here, an example of the composition type that can be adopted in the composition control of each secondary camera 3 will be described as the composition type.

Examples of the composition type here include "UP (close-up shot)", "BS (bust shot)", "WS (waist shot)", and "FF (full figure)" illustrated in FIGS. 4A to 4D.

"UP" is a composition in which the face of the person as an imaging target (subject) is contained within the image frame, and "BS" is a composition in which only the portion from the chest to the tip of the head of the person as an imaging target is contained within the image frame. Furthermore, "WS" is a composition in which only the portion from the waist to the tip of the head of the person as an imaging target is contained within the image frame, and "FF" is a composition in which the entire portion from the head to the feet of the person as an imaging target is contained within the image frame.

In the composition control in the present embodiment, "composition" is specified by "composition type" as illustrated in FIG. 4 and a type of an imaging target (a type of the performer in the present example). For example, the composition is specified as a composition in which an imaging target as a guitar player is captured by a composition type="WS", a composition in which an imaging target as a vocal is captured by a composition type="UP", or the like.

In the present embodiment, the information processing apparatus 1 illustrated in FIG. 1 performs composition selection of each secondary camera 3 according to the composition selection table to be described later with respect to the fixed point position set in advance and the composition of the tracking target, thereby automatically adjusting the composition without receiving the composition specifying operation from the user such as the director or the staff member described above. That is, the information processing apparatus 1 according to the present embodiment selects a composition to be set for each secondary camera 3 according to the composition selection table in response to satisfaction of the predetermined condition, and performs pan and tilt of the corresponding camera platform 4, zoom control of the secondary camera 3, image cutout, and the like so that the selected composition (fixed point) is set.

Note that details of composition control as an embodiment will be described later again.

(1-2. Hardware Configuration of Information Processing Apparatus)

Figure 5:
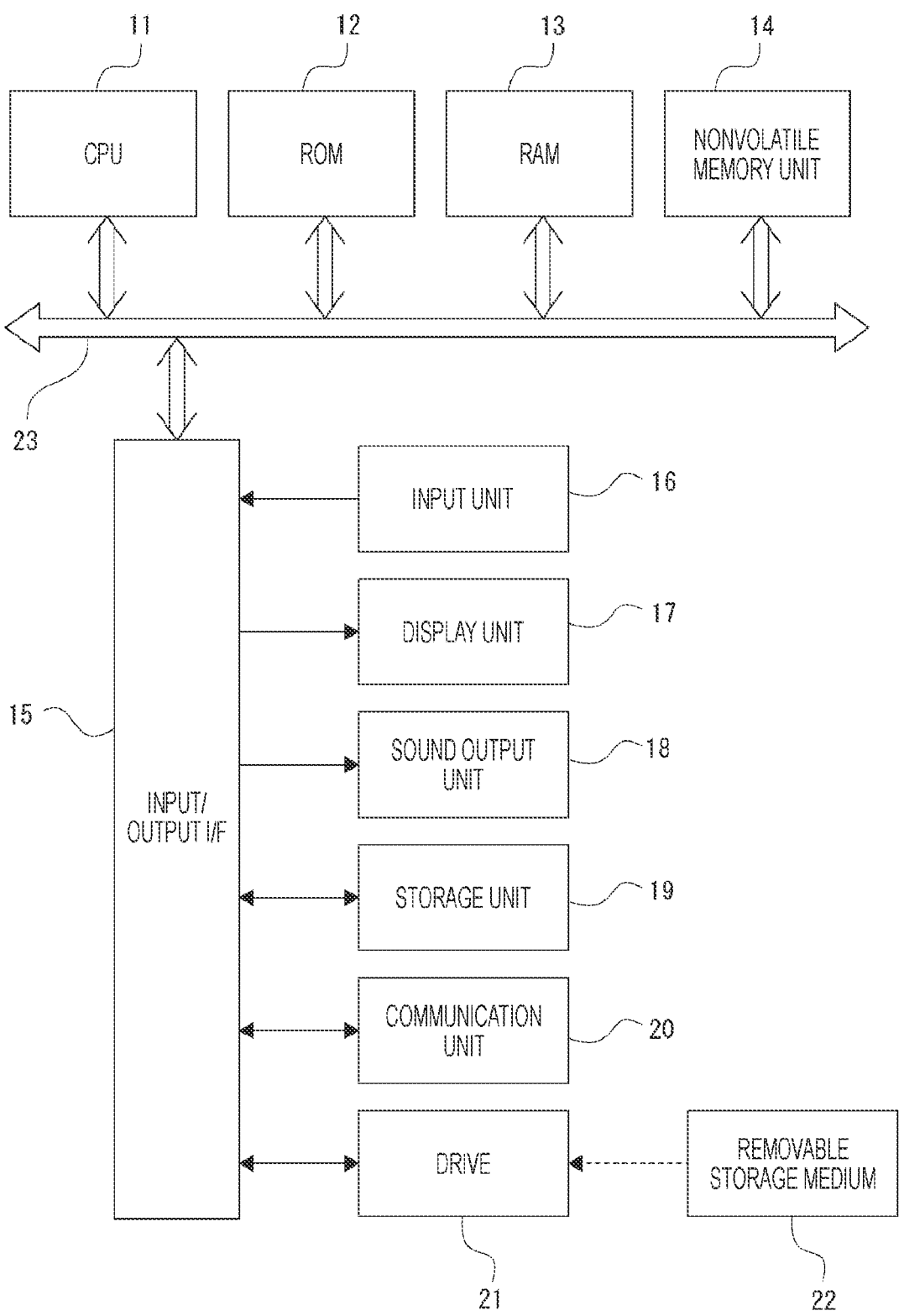
FIG. 5 is a block diagram illustrating a hardware configuration example of an information processing apparatus as an embodiment.

FIG. 5 is a block diagram illustrating a hardware configuration example of the information processing apparatus 1.

As an apparatus form of the information processing apparatus 1, for example, a personal computer or the like can be considered.

In FIG. 5, a CPU 11 of the information processing apparatus 1 executes various types of processing in accordance with a program stored in a nonvolatile memory unit 14 such as a read only memory (ROM) 12 or an electrically erasable programmable read only memory (EEP-ROM), or a program loaded from a storage unit 19 to a random access memory (RAM) 13. As appropriate, the RAM 13 also stores data necessary for the CPU 11 to execute various kinds of processing.

The CPU 11, the ROM 12, the RAM 13, and the nonvolatile memory unit 14 are connected to each other via a bus 23. An input/output interface 15 is also connected to the bus 23.

An input unit 16 including an operation element and an operation device is connected to the input/output interface 15.

For example, as the input unit 16, various types of operation elements and operation devices such as a keyboard, a mouse, a key, a dial, a touch panel, a touch pad, a remote controller, and the like are assumed.

Operation by a user is sensed by the input unit 16, and a signal corresponding to the input operation is interpreted by the CPU 11.

Furthermore, a display unit 17 including a liquid crystal display (LCD), an organic electro-luminescence (EL) panel, or the like, and a sound output unit 18 including a speaker or the like are integrally or separately connected to the input/output interface 15.

The display unit 17 is a display unit that performs various types of displays, and includes, for example, a display device provided in a housing of the information processing apparatus 1, a separate display device connected to the information processing apparatus 1, or the like.

The display unit 17 executes display of an image for various kinds of image processing, a moving image to be processed, or the like, on a display screen on the basis of an instruction from the CPU 11. Furthermore, the display unit 17 displays various types of operation menus, icons, messages, and the like, that is, displays as a graphical user interface (GUI) on the basis of the instruction from the CPU 11.

The storage unit 19 including a hard disk, a solid-state memory, or the like, and a communication unit 20 including a modem or the like may be connected to the input/output interface 15.

The communication unit 20 performs communication with communication processing via a transmission line such as the Internet, wired/wireless communication with various devices, bus communication, or the like.

Furthermore, a drive 21 is also connected to the input/output interface 15 as necessary, and a removable recording medium 22, such as a magnetic disk, an optical disk, a magneto-optical disk, or a semiconductor memory, is appropriately mounted.

The drive 21 can read a data file such as an image file, various computer programs, and the like from the removable recording medium 22. The read data file is stored in the storage unit 19, and an image or audio included in the data file is output by the display unit 17 or the sound output unit 18. Furthermore, a computer program or the like read from the removable recording medium 22 is installed in the storage unit 19 as necessary.

In the information processing apparatus 1, software can be installed via network communication by the communication unit 20 or the removable recording medium 22. Alternatively, the software may be stored in advance in the ROM 12, the storage unit 19, or the like.

(1-3. Composition Control as Embodiment)

Figure 6:
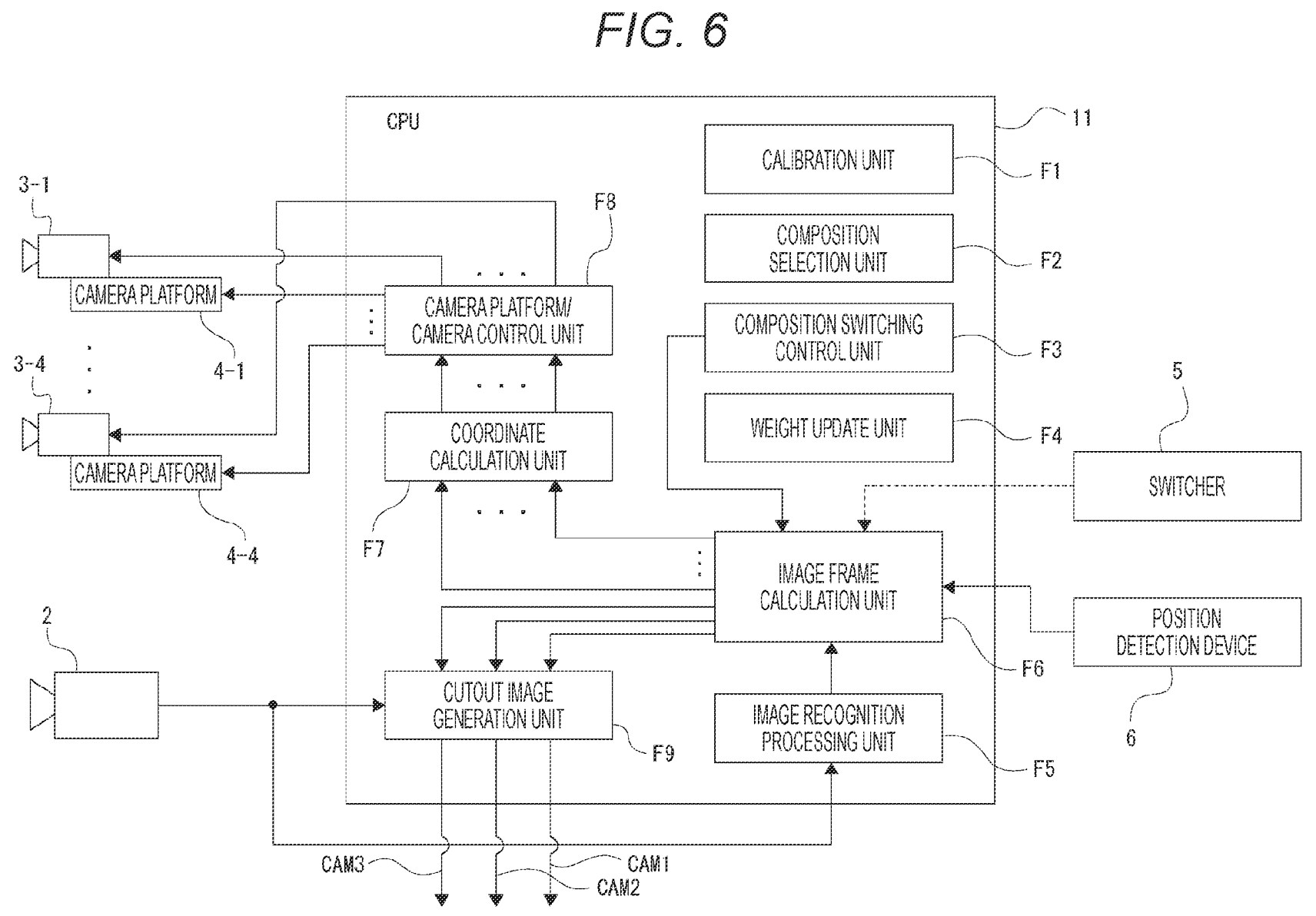

FIG. 6 is an explanatory diagram of functions of the CPU 11 of the information processing apparatus 1, and illustrates the primary camera 2, the secondary camera 3, the camera platform 4, the switcher 5, and the position detection device 6 illustrated in FIG. 1 together with functional blocks of various functions of the CPU 11.

As illustrated, the CPU 11 functions as a calibration unit F1, a composition selection unit F2, a composition switching control unit F3, a weight update unit F4, an image recognition processing unit F5, an image frame calculation unit F6, a coordinate calculation unit F7, a camera platform/camera control unit F8, and a cutout image generation unit F9.

The calibration unit F1 performs calibration processing for obtaining a coordinate transformation matrix for performing coordinate transformation between the coordinate system of the image captured by the primary camera 2 and the coordinate system of the imageable range of each secondary camera 3. The imageable range of the secondary camera 3 means a range in which imaging can be performed using pan and tilt by the camera platform 4.

In the present example, the target composition at the time of performing composition control is determined on the basis of the image captured by the primary camera 2. For example, an image frame according to a composition type such as "BS" or "WS" is determined on the basis of a result of performing image recognition processing on the image captured by the primary camera 2. Therefore, with the coordinate system of the image captured by the primary camera 2 as a master coordinate system, information on the range of the image frame in the coordinate system of the secondary camera 3 is obtained by performing coordinate transformation, and the camera platform 4 and zooming of the secondary camera 3 are controlled on the basis of the information on the range of the image frame in the coordinate system of the secondary camera 3 so that the composition by the image frame defined in the master coordinate system is realized.

The calibration unit F1 performs calibration processing for obtaining the coordinate transformation matrix for performing the coordinate transformation.

Specifically, in the calibration processing, the display unit 17 is caused to display the captured image of the target secondary camera 3 and the captured image of the primary camera 2, and the user is caused to perform an operation of designating a position at which the same position in the real space is projected in each image. On the basis of the information of the designated position, the coordinate transformation matrix for transforming coordinate information in the coordinate system of the primary camera 2 into coordinate information in the coordinate system of the secondary camera 3 can be obtained. Here, the coordinate transformation matrix is obtained for each secondary camera 3.

Note that, although not illustrated, the captured image of the target secondary camera 3 is input to the information processing apparatus 1 at the time of calibration.

The composition selection unit F2 selects the composition of the camera on the basis of the composition selection table.

FIG. 7 is an explanatory diagram of the composition selection table.

The composition selection table is information in which weight information is associated with each combination of an imaging target by the camera and a composition type of the camera.

Here, an example of the composition selection table corresponding to a case where the imaging target event is a music live event and the selectable imaging target is any of a vocal, a guitar player, and a bass player of a music band is illustrated.

The weight information associated with each combination of the imaging target and the composition type, in other words, the weight information associated with each composition specified by the combination of the imaging target and the composition type can be rephrased as information indicating the selectivity of the composition.

In the present embodiment, the composition selection table is prepared at least for each secondary camera 3, and the composition selection unit F2 selects the composition using the corresponding composition selection table for each secondary camera 3.

In the present example, the composition selection table is stored in a predetermined memory device such as the storage unit 19, for example, and the composition selection unit F2 performs composition selection of each secondary camera 3 on the basis of the composition selection table stored in this manner.

For the composition selection table, it is conceivable to prepare a plurality of types of tables in which at least the combination setting of the composition type and the weight information is different for each camera to be subjected to the composition control. For example, a composition selection table in which a combination of a composition type and weight information is set for each of music producers A, B, and C so that compositions frequently used by the music producers are easily selected is prepared, and a table used for composition selection of the composition selection unit F2 can be selected by the user from those composition selection table. This allows the user to select which music producer style's content captured image content is finished as.

Here, in the present example, the composition selection unit F2 performs composition selection for each camera on the basis of prohibited transition composition information so that composition transition that is a predetermined prohibited transition does not occur.

The prohibited transition referred to herein indicates a composition transition to be prohibited for the composition transition between images sequentially selected by the switcher 5.

On the basis of the prohibited transition composition information described above and camera selection history information (corresponding to history information of the composition) by the switcher 5, the composition selection unit F2 performs composition selection based on the composition selection table so that the composition transition between the images sequentially selected by the switcher 5 does not become the prohibited transition determined in the prohibited transition composition information.

Specifically, on the basis of the prohibited transition composition information and the composition of the camera being selected by the switcher 5, the composition selection unit F2 specifies, as the "prohibited transition composition", a composition that becomes the prohibited transition in a case where the next composition is selected by the switcher 5 from the compositions in the composition selection table of each secondary camera 3, and performs composition selection based on the weight information of the composition selection table only for the composition excluding the prohibited transition composition.

An example of composition selection based on such prohibited transition composition information will be described with reference to FIG. 8.

Specifically, a composition selection example for a certain secondary camera 3 will be described in FIG. 8 in a case where a transition from the composition of "bass WS" to the composition of "bass UP" and a transition to the composition of "base" as an imaging target are determined as the prohibited transitions in a state where the composition of the secondary camera 3 being selected by the switcher 5 is "bass WS".

In the composition selection table in this case, since the composition of "base UP" and the composition in which the imaging target is "bass" are prohibited transition compositions, the composition selection unit F2 performs composition selection for the composition excluding these compositions (in the illustrated example, a composition in which a vocal is an imaging target, a composition of "bass WS", and a composition of "bass FF").

As a result, even if the target secondary camera 3 is switched to the selected composition and the captured image of the secondary camera 3 is selected by the switcher 5, it is possible to prevent the composition transition of the output image by the switcher 5 from becoming the prohibition transition.

Furthermore, in the present example, the composition selection unit F2 executes the composition selection based on the composition selection table for each secondary camera 3 described above on condition that image selection by the switcher 5 has been performed.

That is, when any one of the captured images from each camera is newly selected by the switcher 5, the composition selection based on the composition selection table is performed for each secondary camera 3 accordingly, and the composition of each secondary camera 3 is controlled to the corresponding selected composition.

Furthermore, in the present example, the composition selection unit F2 performs the composition selection based on the composition selection table by excluding a camera from which the image is being selected by the switcher 5. As described above, in the present example, the composition selection based on the composition selection table is performed on condition that the image selection by the switcher 5 has been performed. In this case, the composition selection based on the composition selection table is performed by excluding a camera from which an image is being selected by the image selection.

As described above, by excluding the camera from which the image is being selected by the switcher 5 from the target of composition selection, it is possible to prevent composition switching from being performed for the camera selected by the switcher 5 even though the captured image is being selected.

Furthermore, the composition selection unit F2 in the present example performs the composition selection based on the composition selection table only for a music accompaniment section specified from the sound analysis result of the imaging target event.

As an example, each secondary camera 3 is provided with a microphone, and data of sound collected by the microphone is attached to captured image data of each secondary camera 3. Then, the composition selection unit F2 performs sound analysis on the sound data attached in this way, and determines whether or not the sound data is data of the music accompaniment section. On the basis of the determination result, the composition selection unit F2 performs the composition selection based on the composition selection table only for the music accompaniment section.

Note that the method of acquiring the sound data is not limited to the method using the microphone of the camera as described above. For example, it is also conceivable to use sound data collected by a microphone provided in a device other than a camera such as a public address (PA) device for sound analysis. In this case, the sound data is not attached to the captured image of the camera, but is treated as data of a system independent of the captured image.

Note that the determination as to whether or not the sound data is data of a sound accompaniment section can be made on the basis of an operation input from the user.

As for the captured image content of a music event, for example, the need for composition switching is lower in a portion between the pieces of music such as a master of ceremonies (MC) portion than in a middle portion of the piece of music.

By performing the composition selection only for the music accompaniment section as described above, it is possible to prevent unnecessary composition switching from being performed even for a portion between the pieces of music, and a processing load related to the composition switching can be reduced.

In FIG. 6, the composition switching control unit F3 performs control for switching the composition of the camera to the composition selected by the composition selection unit F2. Specifically, the composition switching control unit F3 in the present example performs processing of instructing the composition selected by the composition selection unit F2 for each secondary camera 3 to the image frame calculation unit F6 to be described later.

The weight update unit F4 updates the weight information in the composition selection table.

As an example, the weight update unit F4 updates the weight information on the basis of the selection history information of the camera by the switcher 5. In this case, every time the switcher 5 selects a camera, in other words, a captured image, the weight update unit F4 performs processing of storing the captured image and the composition information as the selection history information in a predetermined storage device such as the storage unit 19, for example, and updates the weight information in the composition selection table on the basis of the selection history information.

In the present example, the weight update unit F4 performs processing so as to increase the weight for the weight information of the composition (selection frequency is more than or equal to a certain frequency) frequently selected by the switcher 5 among the weight information for each composition in each composition selection table.

With this processing, weight update is performed so that a composition that is preferred and frequently used in the switcher 5 is easily selected.

Therefore, the composition control of the captured image content can be performed so as to be as close as possible to the user's preference of the switcher 5, and the quality of the captured image content can be improved.

Furthermore, the weight update unit F4 updates the weight on the basis of the content of the imaging target event. Specifically, in a case where a solo part portion of a musical instrument such as a guitar solo is detected as the content of the imaging target event, for example, the weight update unit F4 in the present example updates the weight information so as to increase the weight of the composition in which the player of the musical instrument is the imaging target.

In the present example, the detection of the solo part portion of the musical instrument is performed on the basis of, for example, a sound analysis result of the imaging target event. Specifically, for example, as described above, the detection is performed on the basis of the sound data attached to the captured image of each secondary camera 3 or the result of the sound analysis on the sound data obtained by the PA device or the like.

Note that the detection of the solo part portion of the musical instrument can also be performed on the basis of an operation input of the user.

As described above, by increasing the weight of the composition in which the player of the musical instrument is the imaging target in response to the detection of the solo part portion of the musical instrument, it is possible to easily select an appropriate composition according to the content of the event, and the quality of the captured image content can be improved.

Here, regarding the timing at which the weight information is updated by the weight update unit F4, at least the following two examples can be considered.

The first example is an example in which the weight information is updated on condition that the image selection by the switcher 5 has been performed.

As a result, in response to the selection of a certain camera (a certain composition) by the switcher 5, it is possible to adjust which composition is made to be easily selected (or hardly selected) for the other camera that has not been selected.

Therefore, it is possible to easily select a composition suitable for the next image selection by the switcher 5 for the unselected camera, and it is possible to increase the possibility that the captured image to be selected by the switcher 5 includes a captured image with an appropriate composition, leading to improvement in the quality of the captured image content.

The second example is an example in which the weight information is updated on condition that a predetermined sound change is detected from the sound analysis result of the imaging target event. For example, it is conceivable to update the weight information on condition that a predetermined tone change such as a change from a singing portion to a solo part portion of the musical instrument is detected.

As a result, for example, in response to the detection of a sound change that is estimated to have transitioned to a guitar solo part, the weight update is performed so that the composition in which the guitar player is an imaging target is easily selected, and the weight update can be performed so that an appropriate composition corresponding to specific content is easily selected in response to the transition of the content on the sound of the imaging target event to the specific content.

Therefore, the quality of the captured image content can be improved.

The image recognition processing unit F5 performs image recognition processing on an image captured by the primary camera 2. The image recognition processing here includes at least recognition processing of the face, position, and range of the subject as a person, and bone estimation (generation of a simplified model of a human body representing the configuration of the human body in main parts such as a face, a torso, an arm, and a foot) of the subject recognized as a person.

In the present example, the information on the position of the subject as an imaging target is comprehensively obtained using not only the detection result by the position detection device 6 but also the subject recognition result based on the captured image of the primary camera 2. That is, in calculating an image frame in which a certain subject is tracked, the image frame calculation unit F6 described below obtains information on the position of the subject on the basis of the position detection result by the position detection device 6 and the subject recognition result by the image recognition processing unit F5.

The image frame calculation unit F6 calculates an image frame for realizing the composition instructed by the composition switching control unit F3. As understood from the above description, the image frame referred to herein is an image frame in the coordinate system of the image captured by the primary camera 2. In the present example, the target of the composition control is each secondary camera 3, and the composition is instructed for each secondary camera 3 from the composition switching control unit F3. Therefore, the image frame calculation unit F6 calculates the image frame for each secondary camera 3 with respect to the instructed composition.

As a specific example, for a certain secondary camera 3, in a case where a composition in which the imaging target is "vocal" and the composition type is "UP" is instructed, the image frame calculation unit F6 acquires position information of the subject as "vocal" on the basis of a position detection result by the position detection device 6 and a recognition result of the subject by the image recognition processing unit F5. At the same time, since bone estimation information of the subject of "vocal" is required to realize the composition by "UP", the bone estimation information is acquired from the image recognition processing unit F5. Then, on the basis of these pieces of acquired information, an image frame for capturing "vocal" with the size of "UP" is calculated.

Furthermore, the image frame calculation unit F6 also calculates image frames for the virtual cameras (the CAM1 to the CAM3 in the present example) as necessary on the basis of, for example, an operation input from the user.

The coordinate calculation unit F7 converts the information of the image frame (coordinate information in the coordinate system of the primary camera 2) for the secondary camera 3 (in the present example, the CAM4 to the CAM7) calculated by the image frame calculation unit F6 into coordinate information in the coordinate system of the secondary camera 3. The coordinate transformation matrix obtained by the calibration unit F1 is used for this coordinate transformation.

On the basis of the information of the image frame subjected to the coordinate transformation by the coordinate calculation unit F7, the camera platform/camera control unit F8 performs control of the pan and tilt of the camera platform 4 and zoom control of the secondary camera 3 as necessary for each secondary camera 3 so as to obtain a composition for imaging the range indicated by the information of the image frame.

With this control, the composition of each secondary camera 3 can be switched to the composition selected by the composition selection unit F2.

The cutout image generation unit F9 performs image cutout on an image captured by the primary camera 2 as necessary according to the information of the image frame for the virtual camera (coordinate information in the coordinate system of the primary camera 2) calculated by the image frame calculation unit F6, and generates captured images of the CAM1, CAM2, and CAM3.

(1-4. Processing Procedure)

Next, a specific example of a processing procedure for realizing the composition control as the first embodiment described above will be described with reference to flowcharts of FIG. 9 and FIG. 10.

Figure 9:
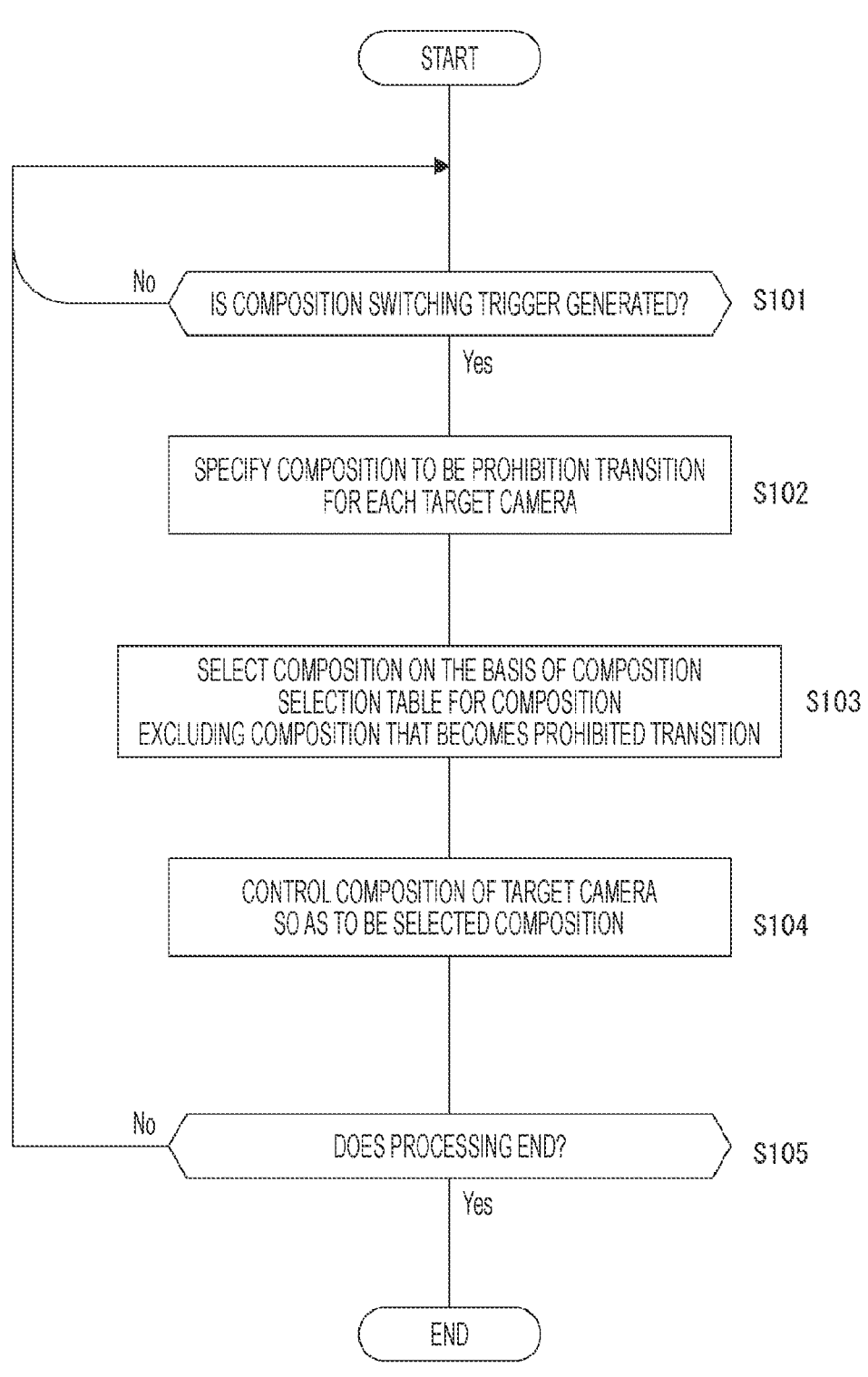
FIG. 9 is a flowchart illustrating an example of a processing procedure for realizing composition selection based on the composition selection table and composition control for switching to the selected composition.
Figure 10:
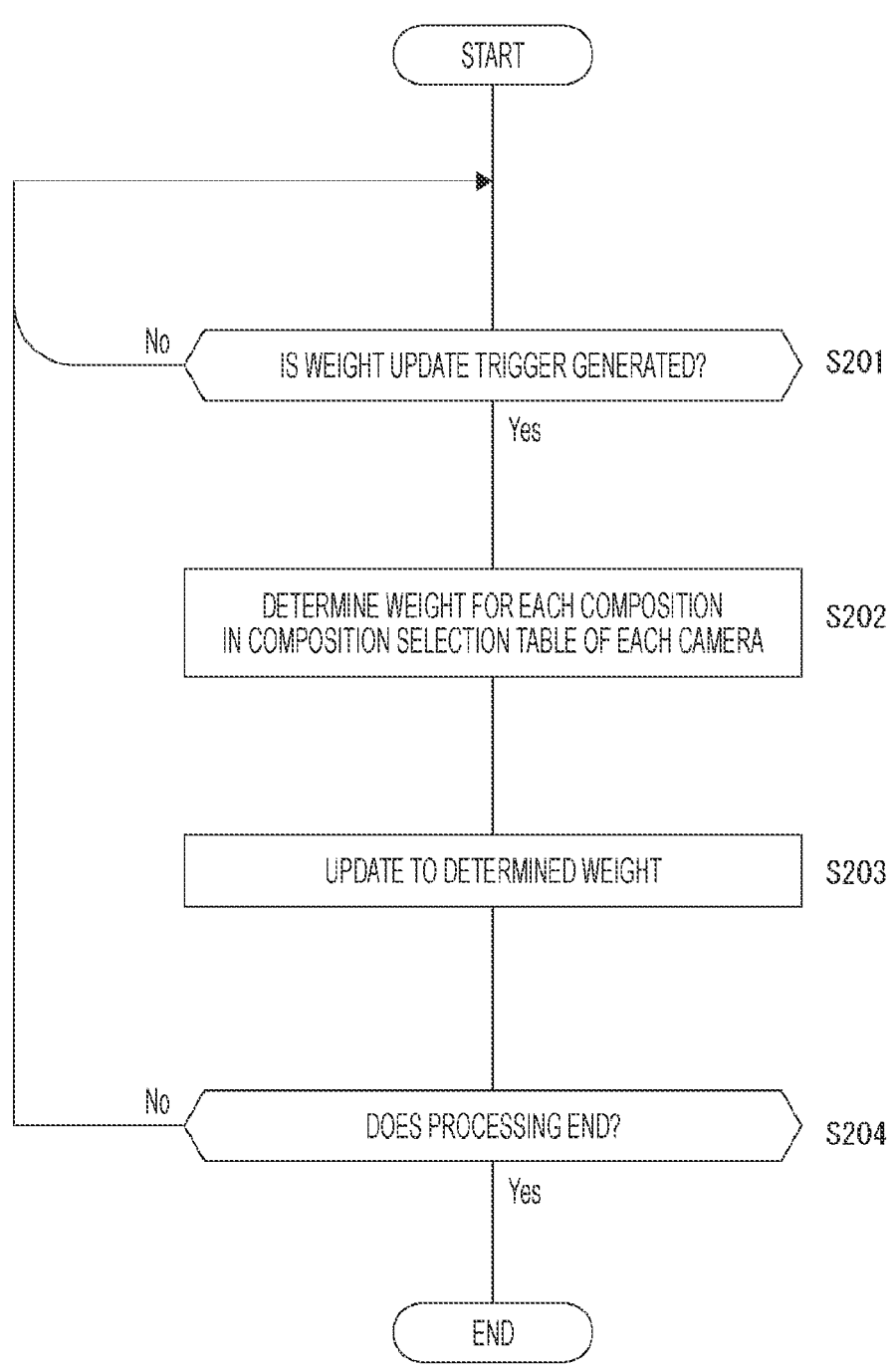
FIG. 10 is a flowchart of processing related to update of weight information in the first embodiment.

The processing illustrated in FIGS. 9 and 10 is executed by the CPU 11 of the information processing apparatus 1.

FIG. 9 illustrates an example of a processing procedure for realizing composition selection based on the composition selection table and composition control for switching to the selected composition.

First, in step S101, the CPU 11 waits until a composition switching trigger is generated. As understood from the above description, in the present example, the generation condition of the composition switching trigger is a condition that the image selection by the switcher 5 is performed and the image selection is performed in the music accompaniment section, and in step S101, the CPU 11 performs processing of waiting for the condition to be satisfied.

In a case where the composition switching trigger is generated, the CPU 11 proceeds to step S102, and performs processing of specifying the composition to be the prohibition transition for each target camera. That is, on the basis of the prohibited transition composition information described above and the information on the composition of the camera being selected by the switcher 5 (based on the camera selection history information described above), processing is performed to specify, as the "prohibited transition composition", the composition that becomes the prohibited transition in a case where the switcher 5 selects the next composition from the compositions in the composition selection table of each secondary camera 3.

Note that, for confirmation, in the specifying processing in step S102, the specifying result that there is no composition corresponding to the prohibited transition composition may be obtained in at least any composition selection table.

In step S103 subsequent to step S102, the CPU 11 performs processing of selecting a composition on the basis of the composition selection table for the composition excluding the composition that becomes the prohibited transition. That is, for a composition selection table having a composition corresponding to the prohibited transition composition, composition selection based on the weight information is performed for the compositions excluding the prohibited transition composition. For a composition selection table having no composition corresponding to the prohibited transition composition, composition selection based on the weight information is performed for each composition in the table.

Note that, in a case where all the compositions are the prohibited transition compositions, the composition is determined in anticipation of the next composition selection with respect to the selection of another camera.

Here, as described above, in a case where the composition selection based on the composition selection table is performed by excluding the camera from which the image is being selected by the switcher 5, the composition selection based on the composition selection table is not executed for the corresponding camera in step S103. As a result, it is possible to prevent composition switching from being performed for the camera from which the image is being selected by the switcher 5.

In step S104 subsequent to step S103, the CPU 11 controls the composition of the target camera so as to be the selected composition. That is, the secondary camera 3 in which the composition selection has been performed on the basis of the composition selection table in step S103 is set as the target camera, and the composition of the target camera is switched to the selected composition by performing the processing as the composition switching control unit F3, the image recognition processing unit F5, the image frame calculation unit F6, the coordinate calculation unit F7, and the camera platform/camera control unit F8 described above.

In step S105 subsequent to step S104, the CPU 11 determines whether or not a processing end condition is satisfied. The processing end condition here is, for example, a predetermined condition determined in advance as a condition that the series of processing illustrated in FIG. 9 should be ended, such as a state where the generation of the captured image content should be ended.

In a case where it is determined that the processing end condition is not satisfied, the CPU 11 returns to step S101. As a result, in response to the generation of the composition switching trigger again, the composition selection based on the composition selection table and the switching processing to the selected composition are executed again for the corresponding secondary camera 3.

On the other hand, in a case where it is determined that the process end condition is satisfied, the CPU 11 ends the series of processing illustrated in FIG. 9.

FIG. 10 is a flowchart of processing related to update of weight information.

In step S201, the CPU 11 waits for generation of a weight update trigger. As understood from the above description, the above-described first example and second example can be considered as the weight update trigger. In the case of the first example, in step S201, the CPU 11 waits for the image selection by the switcher 5. In the case of the second example, in step S201, the CPU 11 waits for the detection of a predetermined sound change from the sound analysis result of the imaging target event (for example, a change from a singing portion to a solo part portion of the musical instrument is detected).

In a case where the weight update trigger is generated, the CPU 11 proceeds to step S202, and performs processing of determining the weight for each composition in the composition selection table of each camera.

For example, as described above, in a case where the weight update is performed so that a composition that is frequently selected by the switcher 5 is easily selected, a higher numerical value is determined for the weight information of the composition in which the selection frequency by the switcher 5 is more than or equal to a certain frequency.

Furthermore, in a case where the weight is updated on the basis of the content of the imaging target event, for example, a higher numerical value is determined for the weight information of the composition in which the player of the musical instrument is an imaging target, corresponding to a case where a solo part portion of the musical instrument is detected.

In step S203 subsequent to step S202, the CPU 11 performs processing of updating to the determined weight. That is, the processing of updating the numerical value of the corresponding weight information among the weight information in the composition selection table for each camera to the numerical value determined in step S202 is performed.

In step S204 subsequent to step S203, the CPU 11 determines whether or not a processing end condition is satisfied. The processing end condition here is, for example, a predetermined condition determined in advance as a condition that the series of processing illustrated in FIG. 10 should be ended, such as a state where the generation of the captured image content should be ended.

In a case where it is determined that the processing end condition is not satisfied, the CPU 11 returns to step S201. As a result, the update of the corresponding weight information is executed according to the generation of the weight update trigger again.

On the other hand, in a case where it is determined that the processing end condition is satisfied, the CPU 11 ends the series of processing illustrated in FIG. 10.

Note that, in the above description, an example is described in which the composition selection based on the composition selection table is executed on condition that the image selection by the switcher 5 has been performed, but the composition selection based on the composition selection table can also be performed according to a content change of the imaging target event.

For example, it is conceivable to perform composition selection based on the composition selection table on condition that a predetermined tone change (event content change) such as a change from a singing portion to a solo part portion of the musical instrument is detected on the basis of the sound analysis result of the imaging target event or the like.

By performing the composition selection based on the composition selection table according to the content change of the imaging target event in this manner, it is possible to perform appropriate composition switching according to the content change of the imaging target event.

Furthermore, it is also conceivable that the composition selection based on the composition selection table is performed according to an elapsed time from composition switching based on previous composition selection. For example, the composition selection is performed on condition that a certain time has elapsed from the composition switching based on the previous composition selection.

Furthermore, it is also conceivable to perform the composition selection based on the composition selection table in response to a predetermined operation input by the user.

In this case, for example, when a predetermined button is operated, the composition selection based on the composition selection table and switching to the selected composition are performed for the camera except for the camera from which the image is being selected by the switcher 5.

Furthermore, regarding the update of the weight information, the weight of the composition that has been selected by the switcher 5 can be lowered on the basis of the camera selection history information by the switcher 5.

As a result, the weight update is performed so that the composition that has been selected by the switcher 5 is hardly selected, and it is possible to prevent the same composition from frequently occurring in the captured image content, and it is possible to prevent the quality deterioration of the content.

2. Second Embodiment

Next, a second embodiment will be described.

In the second embodiment, weight information is updated on the basis of input information regarding an imaging target by an external device.

Note that, in the following description, the same reference numerals are given to portions similar to those already described, and description thereof will be omitted.

Figure 11:
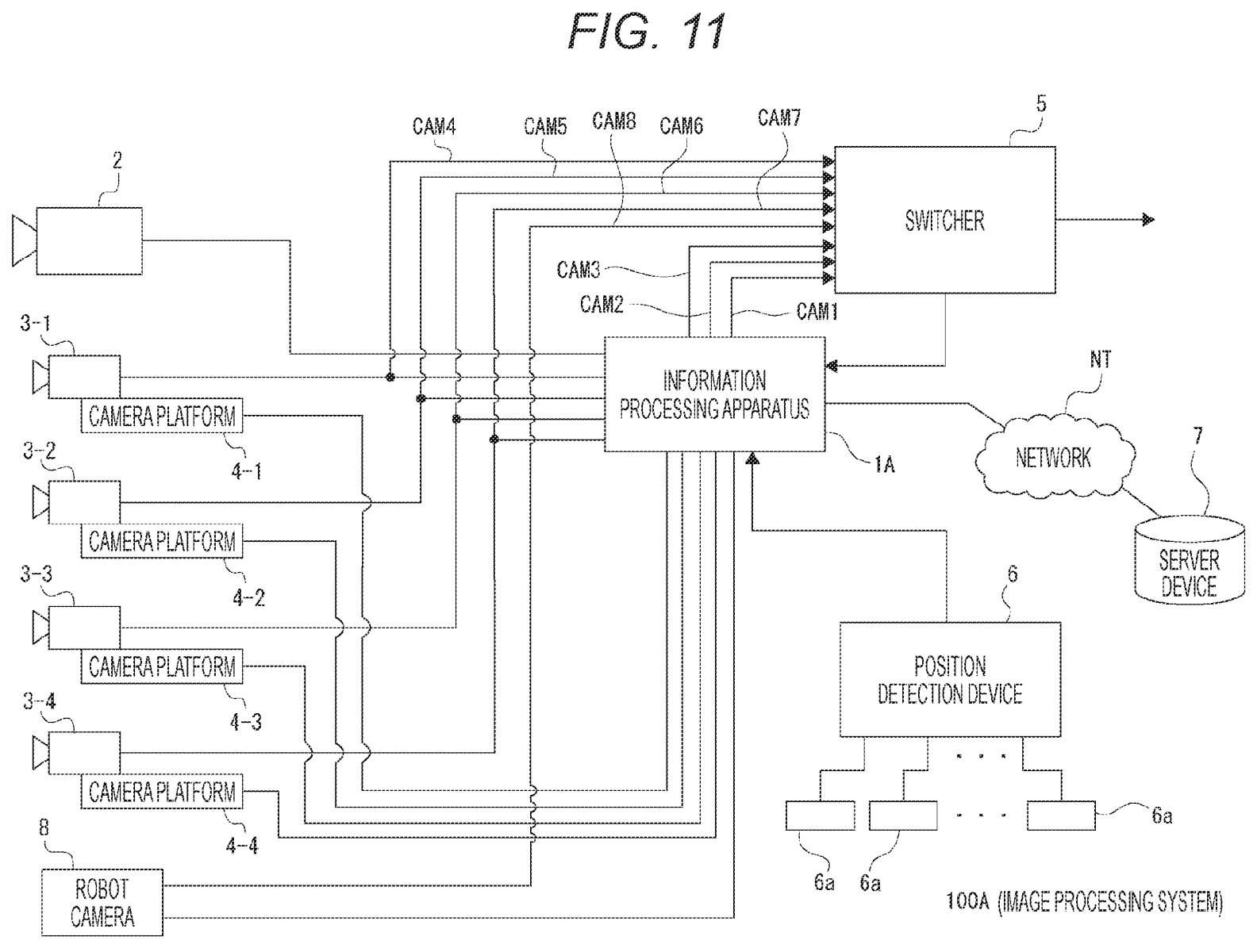

FIG. 11 is a diagram illustrating a configuration example of an image processing system 100A as the second embodiment.

Differences from the image processing system 100 illustrated in FIG. 1 are that an information processing apparatus 1A is provided instead of the information processing apparatus 1, a server device 7 capable of communicating with the information processing apparatus 1A via a network NT is provided, and a robot camera 8 is added.

Note that, in the present example, the network NT is the Internet.

The server device 7 comprehensively indicates a server device as a distribution server of the captured image content generated on the basis of the output image selected by the switcher 5 and a server device as a social networking service (SNS) server. Here, the SNS server referred to herein means a server device having at least a function of causing an information processing terminal such as a smartphone, a tablet terminal, or a personal computer connected to the network NT to acquire web page data of an SNS site and a function of receiving information input such as posted information from the information processing terminal and reflecting the information input in the SNS site.

In the present example, the function as the distribution server of the captured image content includes a function of receiving social tipping from the information processing terminal.

Note that the hardware configuration of the computer device constituting the server device 7 is similar to that illustrated in FIG. 5, and thus the description thereof will be omitted.

Here, it is also possible to adopt a configuration in which the function as the server device 7 is implemented by cooperation of a plurality of computer devices.

The robot camera 8 includes, for example, a camera unit that obtains a captured image by an imaging element such as a CCD image sensor or a CMOS image sensor, and a support unit that supports the camera unit, and the support unit is configured to be self-propelled. Although not illustrated in detail, the robot camera 8 of the present example is configured to freely adjust the position in the height direction of the camera unit and adjust the imaging direction as pan and tilt.

The captured image obtained by the camera unit in the robot camera 8 is input to the switcher 5 (in the figure, CAM8).

Furthermore, adjustment of the height position and the imaging direction of the camera unit in the robot camera 8 and control of traveling are performed on the basis of control by the information processing apparatus 1A.

Figure 12:
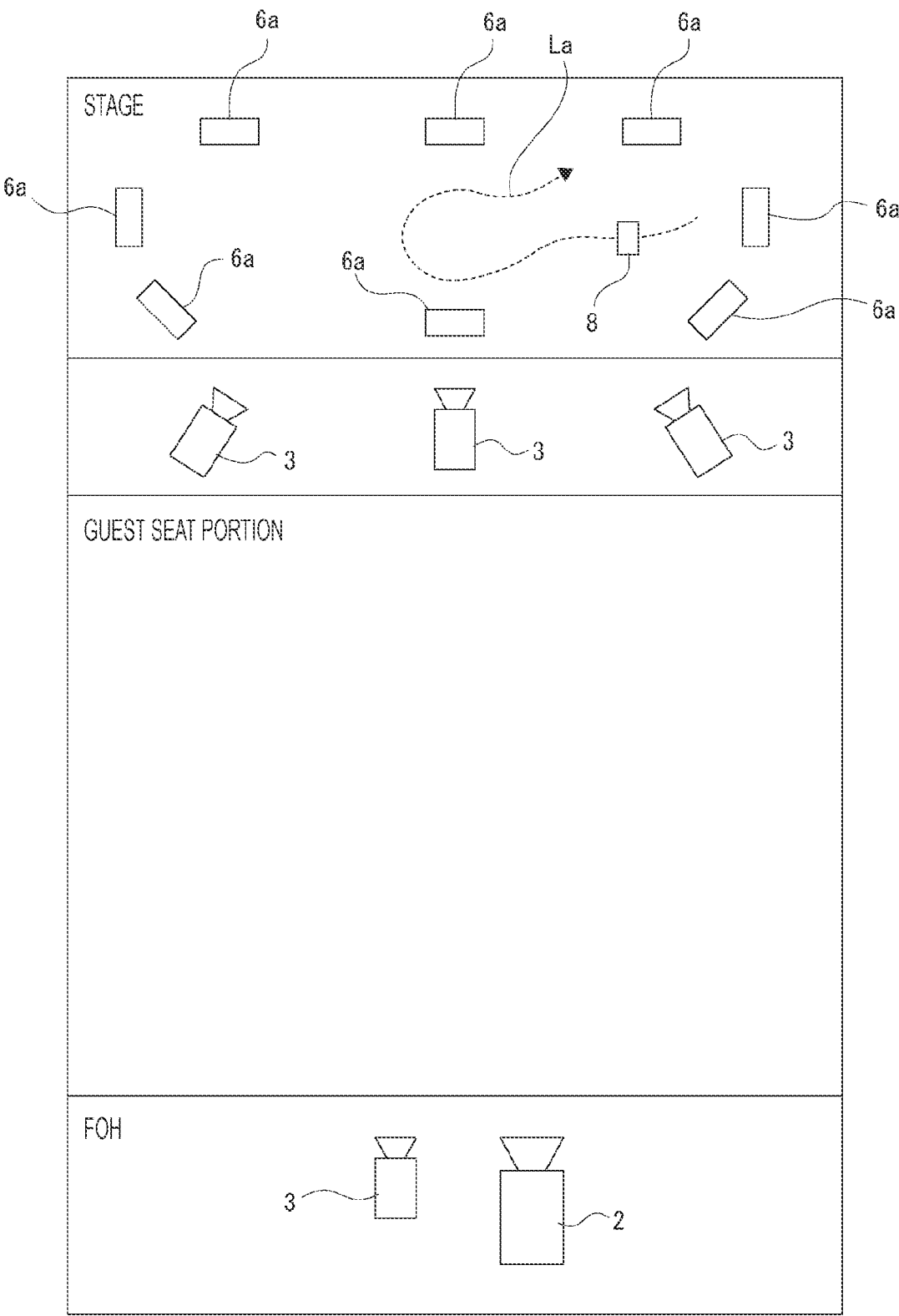
FIG. 12 is an explanatory diagram of an arrangement example of a robot camera in the second embodiment.

FIG. 12 is an explanatory diagram of an arrangement example of the robot camera 8.

As illustrated, in the present example, the robot camera 8 is arranged on a stage in an event venue (a live venue in the present example).

In this case, travel control of the robot camera 8 is performed on the basis of information of a traveling line La determined in advance on the stage. In the present example, the traveling line La is determined for each of a plurality of performers (for example, each member of an idle group) arranged on the stage, and the information processing apparatus 1A performs the travel control of the robot camera 8 such that the robot camera 8 travels on the traveling line La determined corresponding to a certain performer when switching to a composition in which the certain performer is an imaging target.

Here, although not illustrated, the CPU 11 in the information processing apparatus 1A also has functions as the calibration unit F1, the composition selection unit F2, the composition switching control unit F3, the weight update unit F4, the image recognition processing unit F5, the image frame calculation unit F6, the coordinate calculation unit F7, and the camera platform/camera control unit F8 illustrated in FIG. 6 as functions related to composition control for the secondary camera 3.

However, the second embodiment is different from the case of the first embodiment in that the weight update unit F4 has a function described below.

The weight update unit F4 in this case has a function of updating the weight information on the basis of input information regarding the imaging target by the external device. Specifically, the weight update unit F4 in this case updates the weight information in the composition selection table on the basis of the information on social tipping from the information processing terminal to the server device 7 or posted information from the information processing terminal to the SNS site described above.

More specifically, the weight information of the composition selection table is updated so that the composition for which the member having the largest amount of social tipping or the member having the largest number of posted comments is the imaging target is easily selected.

Here, the social tipping or the posted information such as a support comment to a performer in the event can be rephrased as information regarding viewer evaluation (viewer evaluation information) for the performer of the imaging target event. The viewer evaluation referred to herein means evaluation performed on the performer by viewers of captured image content obtained by imaging the imaging target event.

The weight update according to the social tipping or the posted information to the performer as described above can be rephrased as weight update based on the viewer evaluation information.

A specific update example of the weight information in this case will be described with reference to FIGS. 13 and 14.

FIG. 13 illustrates an example of the composition selection table before the weight information is updated, and FIG. 14 illustrates an example of the composition selection table after the weight information is updated.

Here, a case where among a group of three members including a member A to a member C, the amount of social tipping and the number of posted comments for the member A are the largest is exemplified. As illustrated as the transition from FIG. 13 to FIG. 14, all the weights for the composition in which the members other than the member A are the imaging targets are set to zero, and a weight larger than zero is given only to the composition in which the member A is the imaging target.

As a result, in a case where the composition selection based on the composition selection table is performed, it is possible to always switch the composition to the composition in which the member having the largest amount of social tipping or posted comments is the imaging target.

Furthermore, in the second embodiment, the composition selection based on the composition selection table and the switching control to the selected composition are also performed for the robot camera 8 illustrated in FIG. 11, but it is conceivable that the composition selection table for the robot camera 8 is a table as exemplified in FIG. 15, for example.

Specifically, it is conceivable that the composition selection table for the robot camera 8 is a table including information of the traveling line La for each composition type. As illustrated in the drawing, for the composition in which the member A is the imaging target, the information of the traveling line A, which is the traveling line La corresponding to the member A, is stored as the information of the composition type, and for the composition in which the member B is the imaging target, the information of the traveling line B, which is the traveling line La corresponding to the member B, is stored as the information of the composition type, for example. The information indicating the traveling line La determined corresponding to the member to be the imaging target is stored as the information of the composition type in this case.

Furthermore, in the present example, the composition selection table for the robot camera 8 includes angle information in the composition type information. In the example of FIG. 15, for the composition of a part of each member, angle information as a low angle (angle at which the imaging target is looked up from below) is stored together with the information of the traveling line La as the information of the composition type.

Note that the angle information is not limited to the low angle, and is variously conceivable, for example, an angle at which a person as the imaging target is viewed from the height of the eye line (an angle at which a person viewing the content looks at the person as the imaging target).

In the second embodiment, weight update according to the amount of social tipping and the number of posted comments is also performed for the robot camera 8.

Specifically, the weight update unit F4 in this case also updates the weight information in the composition selection table of the robot camera 8 so that the composition in which the member having the largest amount of social tipping or the member having the largest number of posted comments is the imaging target is easily selected.

FIG. 16 is an explanatory diagram of an update example of weight information in the composition selection table of the robot camera 8.

Here, the update example in a case where the amount of social tipping or the number of posted comments for the member A among the member A and the member B is the largest is illustrated.

As can be seen from a comparison with FIG. 15, in this case, the weights of the composition for the member B are all set to zero, and the weights of the composition by the combination of "traveling line A and UP" and the composition by the combination of "traveling line A and low angle" of the compositions for the member A are updated to numerical values larger than zero. Specifically, in this case, as illustrated in the drawing, the weight of the composition including the low angle is maximized. For example, the weight of the composition by the combination of "traveling line A and UP" is set to 20, and the weight of the composition by the combination of "traveling line A and low angle" is set to 80.

By performing the weight update as described above, it is possible to always switch the robot camera 8 to the composition in which the member having the largest amount of social tipping or posted comments is the imaging target.

Furthermore, according to the weight update as described above, it is possible to most easily select a composition in which the corresponding member is captured at the low angle.

Note that, as illustrated in FIG. 15, in the present example, the original weight of the composition by the low angle is set to zero, and the weight of the composition by the low angle is set to be the highest in a case where weight update according to the amount of social tipping and the number of posted comments is performed.

As a result, it is possible to develop the composition by the low angle only in a case where the composition switching according to the amount of social tipping and the number of posted comments is performed.

Figure 17:
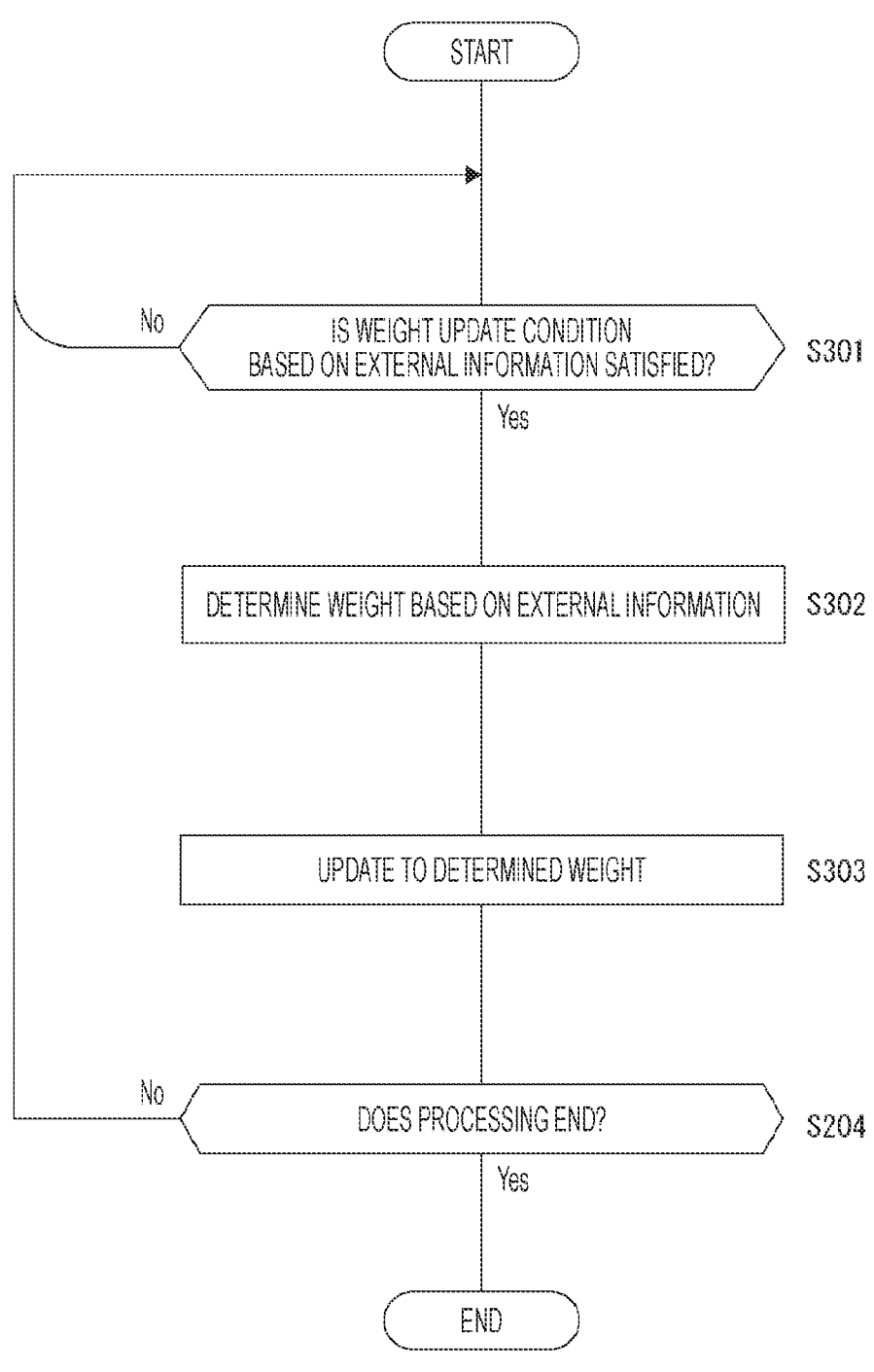
FIG. 17 is a flowchart illustrating a specific example of a processing procedure for implementing weight update as the second embodiment.

FIG. 17 is a flowchart illustrating a specific example of a processing procedure for implementing the weight update as the second embodiment described above.

Note that the processing illustrated in FIG. 17 is executed by the CPU 11 of the information processing apparatus 1A.

In this case, the CPU 11 waits until a weight update condition based on external information is satisfied in step S301. Specifically, in the present example, the CPU 11 waits for the end timing of the reception period of the social tipping or the reception period of the posted comment to the member.

Note that it is assumed that the reception of the posted comment is performed in advance before the distribution of the captured image content. In that case, as the processing of step S301, it is conceivable to perform processing of waiting for arrival of any timing between the reception end timing of the posted comment and the start timing of the music to be the target of the composition switching according to the number of posted comments.

In a case where the weight update condition based on the external information is satisfied, the CPU 11 proceeds to step S302 and determines the weight based on the external information.

Specifically, as described above with reference to FIGS. 13 to 16, for the composition selection table of each secondary camera 3 and the composition selection table of the robot camera 8, the numerical value of the weight information is determined such that the composition in which the member having the largest amount of social tipping or the largest number of posted comments is the imaging target is easily selected.

At this time, the weight determination in the composition selection table of the robot camera 8 is performed so that the composition by the low angle is most easily selected as described above.

In step S303 subsequent to step S302, the CPU 11 performs processing of updating to the determined weight. That is, for the composition selection table of each secondary camera 3 and the composition selection table of the robot camera 8, processing of updating the numerical value of the weight information for each composition to the numerical value determined in step S302 is performed.

In this case, the CPU 11 determines whether or not the processing end condition is satisfied in step S204 in response to the execution of the processing in step S303, returns to step S301 in a case where it is determined that the processing end condition is not satisfied, and ends the series of processing illustrated in FIG. 17 in a case where it is determined that the processing end condition is satisfied.

Note that, in the above description, an example is described in which the weight update is performed so that the composition in which the performer having the largest amount of social tipping and the largest number of posted comments is the imaging target is easily selected. However, it is also conceivable to set the composition selection table and perform the weight update so that the composition as a group shot capturing a plurality of top performers having the large amount of social tipping and the large number of posted comments is easily selected.

Furthermore, as the weight update according to the amount of social tipping and the number of posted comments, it is conceivable to perform such that a difference in the amount of social tipping and a difference in the number of posted comments for each performer are reflected as a difference in the weight information for each performer in the composition selection table.

3. Modifications

Here, embodiments are not limited to the specific examples described so far, and configurations as various modifications can be adopted.

For example, in the above description, an example is described in which the composition selection using the composition selection table or the composition switching is performed for the composition of the real camera, but the composition selection using the composition selection table or the composition switching may be performed for the composition of the virtual camera.

Furthermore, in the above description, an example is described in which the camera being selected by the switcher 5 is excluded from the target of composition selection based on the composition selection table, but it is also conceivable to exclude a camera in which the elapsed time from the previous composition switching is less than a certain time from the target of composition selection based on the composition selection table.

Furthermore, regarding weight update in the composition selection table, it is also conceivable to automatically perform weight update for a composition that has not been selected by the switcher 5 even when a predetermined time or more has elapsed from the establishment timing of the weight update start condition or the previous weight update timing. For example, it is conceivable to decrease the weight so that selecting the corresponding composition is difficult. Alternatively, it is also conceivable to increase the weight so that the corresponding composition is easily selected.

Furthermore, in the above description, an example is described in which the information processing apparatus 1 (or 1A) performs the composition selection based on the composition selection table. However, it is also conceivable that a composition selection table is provided in a camera, and the camera is configured to perform the composition selection based on the composition selection table.

Furthermore, in the above description, an example is described in which the device that performs composition selection based on the composition selection table and the device that controls composition changing means such as the camera platform 4 so that switching to the selected composition is performed are integrally configured, but these devices can be configured separately. In this case, it is conceivable that the latter device is disposed at an event venue, and the former device is disposed to be able to perform network communication with the latter device at a place different from the event venue, for example, as a cloud server.

Furthermore, in the above description, an example is described in which the camera being selected by the switcher 5 (what is called a camera from which PGM is being output) is excluded and composition selection based on the composition selection table is performed. However, in a case where what is called a NEXT (Preview) camera (a camera from which PGM is to be output next to a camera from which PGM is being output: a candidate camera for PGM output) can be selected as selection by the switcher 5, it is also possible to perform composition selection based on the composition selection table by excluding both of the camera from which PGM is being output and the NEXT (Preview) camera or only the NEXT (Preview) camera.

Furthermore, in the above description, an example is described in which the switcher 5 is configured as a hardware device, but the switcher 5 may be implemented by a software program in the information processing apparatus.

Furthermore, regarding the composition switching control, in a state where a composition other than the prohibited transition composition has already been set as the composition of the target camera, and in a case where the composition has not yet been PGM output, the composition of the target camera may be maintained without switching regardless of the weight information in the composition selection table of the target camera.

Furthermore, in the above description, a case where the imaging target event is a music live event is exemplified, but the present technology can also be suitably applied to a case where other events are imaging targets, for example, a program recording in a studio, a sports event such as baseball, soccer, basketball, volleyball, or the like, as well as an event in which a program is performed on a stage (regardless of indoor or outdoor), for example, a musical, and the like.

4. Program

Although the information processing apparatus (the information processing apparatus 1 or 1A) as the embodiment is described above, the program of the embodiment is a program that causes a computer device such as a CPU to execute processing as the information processing apparatus 1 or the information processing apparatus 1A.

The program according to the embodiment is a program readable by a computer device, the program causing the computer device to implement a function of selecting a composition of the camera on the basis of a composition selection table in which weight information is associated with each combination of an imaging target by the camera and a composition type of the camera, and performing control for switching the composition of the camera to the selected composition.

That is, this program corresponds to, for example, a program for causing the computer device to execute the processing described in FIG. 9 and the like.

Such a program can be stored in advance in a recording medium readable by the computer device, for example, a ROM, a hard disk drive (HDD), a solid state drive (SSD), or the like. Alternatively, the program can be temporarily or permanently stored (stored) in a removable recording medium such as a semiconductor memory, a memory card, an optical disk, a magneto-optical disk, or a magnetic disk. Such a removable recording medium can also be provided as what is called package software.

Furthermore, such a program can be installed from removable recording medium into a personal computer or the like, or can be downloaded from a download site to a required information processing apparatus such as a smartphone via a network such as a LAN or the Internet.

5. Summary of Embodiment

As described above, the information processing apparatus (the information processing apparatus 1 or 1A) as the embodiment includes: a composition selection unit (the composition selection unit F2) that selects a composition of a camera on the basis of a composition selection table in which weight information is associated with each combination of an imaging target by the camera and a composition type of the camera; and a composition switching control unit (the composition switching control unit F3) that performs control for switching the composition of the camera to the composition selected by the composition selection unit.

According to the configuration described above, the composition switching of the camera is automatically performed on the basis of the composition selection table, and the composition switching mode of the camera can be appropriately set by setting the weight information in the composition selection table.

Therefore, for the captured image content accompanied by the composition switching, it is possible to achieve both improvement in the quality of the content and the reduction of the work cost related to the content creation.

Furthermore, in the information processing apparatus as the embodiment, the information processing apparatus includes a plurality of the cameras, image selection is performed by a switcher (the switcher 5) from among captured images of the plurality of the cameras, and the composition selection unit executes composition selection based on the composition selection table on condition that the image selection by the switcher has been performed.

As a result, in a case where captured images of the plurality of cameras are selected by the switcher and captured image content is generated, in response to selection of a certain camera (certain composition) by the switcher, it is possible to perform composition switching of another camera that has not been selected.

Therefore, it is possible to switch the composition of the unselected camera to a composition suitable for the next selection by the switcher, and the quality of the content can be improved while reducing the work cost by the composition selection automation.

Moreover, in the information processing apparatus as the embodiment, the composition selection unit performs the composition selection of the camera based on the composition selection table according to a content change of an imaging target event by the camera.

As a result, for example, it is possible to perform composition switching of the camera according to a content change of the target event, such as a tone change of a musical piece in a case where the imaging target event is a music live event.

Therefore, it is possible to perform appropriate composition switching according to the content change of the imaging target event.

Furthermore, in the information processing apparatus as the embodiment, the composition type includes a type of an angle of view.

As a result, as composition switching of the camera, for example, it is possible to perform switching to a composition having a different angle of view such as a bust shot (BS) or a waist shot (WS).

Furthermore, in the information processing apparatus as the embodiment, the composition type includes a type of an angle (refer to FIG. 7, FIG. 15, and the like).

As a result, as composition switching of the camera, it is possible to realize composition switching that changes the line-of-sight direction with respect to an imaging target, for example, an angle (low angle) of looking up the imaging target from below, an angle of viewing from the height of the eye line, or the like.

Moreover, the information processing apparatus as the embodiment includes a weight update unit (the weight update unit F4) that updates the weight in the composition selection table.

By updating the weight in the composition selection table, it is possible to switch the easiness of selection of each composition.

Therefore, for example, it is possible to perform appropriate composition switching according to the situation, such as updating the weight so that the composition in which the guitar is an imaging target is easily selected in a guitar solo part.

Furthermore, in the information processing apparatus as the embodiment, the information processing apparatus includes a plurality of the cameras, image selection is performed by a switcher from among captured images of the plurality of the cameras, and the weight update unit updates the weight on the basis of camera selection history information by the switcher.

As a result, for example, by updating the weight so that a composition that has been frequently selected in the switcher in the past is easily selected, it is possible to easily select a composition that is preferred and frequently used in the switcher, or conversely, by updating the weight so that a composition that has been selected in the switcher is hardly selected, it is possible to prevent the same composition from frequently occurring in the captured image content, that is, to prevent deterioration in the quality of the content.

Therefore, as composition switching based on the composition selection table, it is possible to perform appropriate composition switching based on the past camera selection history (composition selection history) by the switcher, and the quality of the content can be improved.

Furthermore, in the information processing apparatus as the embodiment, the weight update unit increases the weight of the composition that has been selected by the switcher.

As a result, weight update is performed so that a composition that is preferred and frequently used in the switcher is easily selected.

Therefore, it is possible to perform the composition control of the captured image content so as to be as close as possible to the user's preference of the switcher, and the quality of the captured image content can be improved.

Moreover, in the information processing apparatus as the embodiment, the weight update unit updates the weight on the basis of content of the imaging target event by the camera.

As a result, it is possible to easily select an appropriate composition according to the content of the imaging target event, such as facilitating selection of a composition in which the guitar is an imaging target in a case where the event to be imaged becomes a guitar solo part in a music live show, for example.

Therefore, the quality of the captured image content can be improved.

Furthermore, in the information processing apparatus as the embodiment, the weight update unit updates the weight on the basis of a sound analysis result of the imaging target event.

As a result, for example, the weight update can be performed so that an appropriate composition is easily selected according to the content of the event estimated from the aspect of the sound, such as a guitar solo part in a case where the imaging target event is a music live show.

Therefore, the quality of the captured image content can be improved.

Furthermore, in the information processing apparatus as the embodiment, the weight update unit updates the weight on the basis of input information regarding an imaging target by an external device (refer to the second embodiment).

As a result, for example, the weight update can be performed on the basis of input information regarding the imaging target by the external device, such as social tipping or a support comment with respect to the imaging target as a specific member in an idle group. For example, the weight update is performed so that the composition capturing the imaging target having the largest number of social tipping and support comments is easily selected.

Therefore, it is possible to generate the captured image content with a composition appropriately reflecting the intention of the person who has input information regarding the imaging target, such as the distribution recipient of the content.

Furthermore, in the information processing apparatus as the embodiment, the weight update unit updates the weight on the basis of viewer evaluation information regarding viewer evaluation for a performer of an imaging target event by the camera.

The viewer evaluation referred to herein means evaluation performed on the performer by viewers of captured image content obtained by imaging the imaging target event. As an example of the viewer evaluation information, for example, information such as social tipping or a support comment to the performer can be exemplified.

According to the above configuration, for example, weight update can be performed on the basis of viewer evaluation information for a performer, such as social tipping or a support comment for a specific member in an idle group. For example, the weight update is performed so that the composition capturing the performer having the largest number of social tipping and support comments is easily selected.

Therefore, it is possible to generate the captured image content by the composition appropriately reflecting the intention of the content viewer.

Moreover, in the information processing apparatus as the embodiment, the information processing apparatus includes a plurality of the cameras, image selection is performed by a switcher from among captured images of the plurality of the cameras, and the weight update unit updates the weight on condition that image selection by the switcher has been performed.

As a result, in response to the selection of a certain camera (a certain composition) by the switcher, it is possible to adjust which composition is made to be easily selected (or hardly selected) for the other camera that has not been selected.

Therefore, it is possible to easily select a composition suitable for the next image selection by the switcher for the unselected camera, and it is possible to increase the possibility that the captured image to be selected by the switcher includes a captured image with an appropriate composition, and the quality of the captured image content can be improved.

Furthermore, in the information processing apparatus as the embodiment, the weight update unit updates the weight on condition that a predetermined sound change is detected from a sound analysis result of the imaging target event by the camera.

As a result, for example, in response to the detection of the sound change in which the imaging target event is estimated to have transitioned to a guitar solo part at the music live show, the weight update is performed so that the composition in which the guitar is the imaging target is easily selected, for example. In this manner, in response to the transition of the content of the sound of the imaging target event to the specific content, the weight update can be performed so that an appropriate composition according to the specific content is easily selected.

Therefore, the quality of the captured image content can be improved.

Furthermore, in the information processing apparatus as the embodiment, the information processing apparatus includes a plurality of the cameras, image selection is performed by a switcher from among captured images of the plurality of the cameras, and the composition selection unit performs composition selection based on the composition selection table by excluding the camera from which an image is being selected by the switcher.

As a result, it is possible to prevent composition switching from being performed even though the captured image is being selected for the camera selected by the switcher.

Moreover, in the information processing apparatus as the embodiment, the composition selection unit performs composition selection based on the composition selection table only for a music accompaniment section specified from a sound analysis result of an imaging target event by the camera.

As for the captured image content of a music event, for example, the need for composition switching is lower in a portion between the pieces of music such as the MC portion than in a middle portion of the piece of music.

According to the above configuration, it is possible to prevent unnecessary composition switching from being performed even for a portion between pieces of music, and a processing load related to composition switching can be improved.

Furthermore, in the information processing apparatus as the embodiment, the information processing apparatus includes a plurality of the cameras, image selection is performed by a switcher from among captured images of the plurality of the cameras, and the composition selection unit performs composition selection on the basis of camera selection history information by the switcher and the composition selection table.

As a result, for example, in a case where the composition transition between specific compositions is determined as the prohibited transition, such as switching from the composition in which the guitar is the imaging target to the composition in which the bass is the imaging target, it is possible to prevent the switching to the composition that becomes the prohibited transition from being performed.

Furthermore, an information processing method as the embodiment is an information processing method in which an information processing apparatus includes: selecting a composition of a camera on the basis of a composition selection table in which weight information is associated with each combination of an imaging target by the camera and a composition type of the camera; and performing control for switching the composition of the camera to the composition selected by the composition selection unit.

With such an information processing method, functions and effects similar to functions and effects of the information processing apparatus as the embodiment described above can be obtained.

Note that effects described in the present description are merely examples and are not limited, and other effects may be provided.

6. Present Technology

Note that the present technology can also employ the following configurations.

(1)

An information processing apparatus including:

a composition selection unit that selects a composition of a camera on the basis of a composition selection table in which weight information is associated with each combination of an imaging target by the camera and a composition type of the camera; and a composition switching control unit that performs control for switching the composition of the camera to the composition selected by the composition selection unit.

(2)

The information processing apparatus according to (1), in which the information processing apparatus includes a plurality of the cameras, image selection is performed by a switcher from among captured images of the plurality of the cameras, and the composition selection unit executes composition selection of the camera based on the composition selection table on condition that the image selection by the switcher has been performed.

(3)

The information processing apparatus according to (1) or (2), in which the composition selection unit performs composition selection of the camera based on the composition selection table according to a content change of an imaging target event by the camera.

(4)

The information processing apparatus according to any one of (1) to (3), in which the composition type includes a type of an angle of view.

(5)

The information processing apparatus according to any one of (1) to (3), in which the composition type includes a type of an angle.

(6)

The information processing apparatus according to any one of (1) to (5), further including a weight update unit that updates the weight in the composition selection table.

(7)

The information processing apparatus according to (6), in which the information processing apparatus includes a plurality of the cameras, image selection is performed by a switcher from among captured images of the plurality of the cameras, and the weight update unit updates the weight on the basis of camera selection history information by the switcher.

(8)

The information processing apparatus according to (7), in which the weight update unit increases the weight of the composition that has been selected by the switcher.

(9)

The information processing apparatus according to any one of (6) to (8), in which the weight update unit updates the weight on the basis of content of an imaging target event by the camera.

(10)

The information processing apparatus according to (9), in which the weight update unit updates the weight on the basis of a sound analysis result of the imaging target event.

(11)

The information processing apparatus according to any one of (6) to (10), in which the weight update unit updates the weight on the basis of input information regarding the imaging target by an external device.

(12)

The information processing apparatus according to any one of (6) to (11), in which the weight update unit updates the weight on the basis of viewer evaluation information regarding viewer evaluation for a performer of an imaging target event by the camera.

(13)

The information processing apparatus according to any one of (6) to (12), in which the information processing apparatus includes a plurality of the cameras, image selection is performed by a switcher from among captured images of the plurality of the cameras, and the weight update unit updates the weight on condition that image selection by the switcher has been performed.

(14)

The information processing apparatus according to any one of (6) to (13), in which the weight update unit updates the weight on condition that a predetermined sound change is detected from a sound analysis result of an imaging target event by the camera.

(15)

The information processing apparatus according to any one of (1) to (14), in which the information processing apparatus includes a plurality of the cameras, image selection is performed by a switcher from among captured images of the plurality of the cameras, and the composition selection unit performs composition selection based on the composition selection table by excluding the camera from which an image is being selected by the switcher.

(16)

The information processing apparatus according to any one of (1) to (15), in which the composition selection unit performs composition selection based on the composition selection table only for a music accompaniment section specified from a sound analysis result of an imaging target event by the camera.

(17)

The information processing apparatus according to any one of (1) to (16), in which the information processing apparatus includes a plurality of the cameras, image selection is performed by a switcher from among captured images of the plurality of the cameras, and the composition selection unit performs composition selection on the basis of camera selection history information by the switcher and the composition selection table.

(18)

An information processing method including by an information processing apparatus selecting a composition of a camera on the basis of a composition selection table in which weight information is associated with each combination of an imaging target by the camera and a composition type of the camera; and performing control for switching the composition of the camera to the selected composition.

(19)

A program readable by a computer device, the program causing the computer device to implement a function of selecting a composition of a camera on the basis of a composition selection table in which weight information is associated with each combination of an imaging target by the camera and a composition type of the camera, and performing control for switching the composition of the camera to the selected composition.

REFERENCE SIGNS LIST

100, 100A Image processing system
1, 1A Information processing apparatus
2 Primary camera
3, 3-1, 3-2, 3-3, 3-4 Secondary camera
4, 4-1, 4-2, 4-3, 4-4 Camera platform
Switcher
6 Position detection device
6a Receiver
7 Server device
8 Robot camera
11 CPU
12 ROM
13 RAM
14 Nonvolatile memory unit
20 Communication unit
23 Bus
F1 Calibration unit
F2 Composition selection unit
F3 Composition switching control unit
F4 Weight update unit
F5 Image recognition processing unit
F6 Image frame calculation unit
F7 Coordinate calculation unit
F8 Camera platform/camera control unit
F9 Cutout image generation unit
NT Network
La Traveling line

The invention claimed is:

1. An information processing apparatus comprising:

circuitry configured to select a composition of a camera on a basis of a composition selection table in which weight information is associated with each combination of an imaging target by the camera and a composition type of the camera, perform control for switching the composition of the camera to the selected composition, and update the weight in the composition selection table; and a plurality of the cameras, wherein image selection is performed by a switcher from among captured images of the plurality of the cameras, wherein the circuitry updates the weight on a basis of camera selection history information by the switcher, and wherein the circuitry increases the weight of the composition that has been selected by the switcher.

2. The information processing apparatus according to claim 1, wherein the information processing apparatus comprises a plurality of the cameras, image selection is performed by a switcher from among captured images of the plurality of the cameras, and the circuitry executes composition selection of the camera based on the composition selection table on condition that the image selection by the switcher has been performed.

3. The information processing apparatus according to claim 1, wherein the circuitry performs composition selection of the camera based on the composition selection table according to a content change of an imaging target event by the camera.

4. The information processing apparatus according to claim 1, wherein the composition type includes a type of an angle of view.

5. The information processing apparatus according to claim 1, wherein the composition type includes a type of an angle.

6. The information processing apparatus according to claim 1, wherein the circuitry updates the weight on a basis of content of an imaging target event by the camera.

7. The information processing apparatus according to claim 6, wherein the circuitry updates the weight on a basis of a sound analysis result of the imaging target event.

8. The information processing apparatus according to claim 1, wherein the circuitry updates the weight on a basis of input information regarding the imaging target by an external device.

9. The information processing apparatus according to claim 1, wherein the circuitry updates the weight on a basis of viewer evaluation information regarding viewer evaluation for a performer of an imaging target event by the camera.

10. The information processing apparatus according to claim 1, wherein the circuitry updates the weight on condition that image selection by the switcher has been performed.

11. The information processing apparatus according to claim 1, wherein the circuitry updates the weight on condition that a predetermined sound change is detected from a sound analysis result of an imaging target event by the camera.

12. The information processing apparatus according to claim 1, wherein the circuitry performs composition selection based on the composition selection table by excluding the camera from which an image is being selected by the switcher.

13. The information processing apparatus according to claim 1, wherein the circuitry performs composition selection based on the composition selection table only for a music accompaniment section specified from a sound analysis result of an imaging target event by the camera.

14. The information processing apparatus according to claim 1, wherein the circuitry performs composition selection on a basis of camera selection history information by the switcher and the composition selection table.

15. An information processing method comprising, by an information processing apparatus having a plurality of cameras, selecting a composition of a camera on a basis of a composition selection table in which weight information is associated with each combination of an imaging target by the camera and a composition type of the camera;

performing control for switching the composition of the camera to the selected composition; and updating the weight in the composition selection table, wherein image selection is performed by a switcher from among captured images of the plurality of the cameras, wherein the weight is updated on a basis of camera selection history information by the switcher, and wherein the weight of the composition that has been selected by the switcher is increased.

16. A non-transitory computer-readable medium having embodied thereon a program readable by a computer device, the program causing the computer device to execute an information processing method, the method comprising:

selecting a composition of a camera on a basis of a composition selection table in which weight information is associated with each combination of an imaging target by the camera and a composition type of the camera, performing control for switching the composition of the camera to the selected composition; and updating the weight in the composition selection table, wherein image selection is performed by a switcher from among captured images of a plurality of the cameras, wherein the weight is updated on a basis of camera selection history information by the switcher, and wherein the weight of the composition that has been selected by the switcher is increased.

* * * * *